US010200315B2

(12) United States Patent
Tiernan

(10) Patent No.: US 10,200,315 B2
(45) Date of Patent: Feb. 5, 2019

(54) VIRTUAL CONCIERGE SYSTEMS AND METHODS

(71) Applicant: John V. Tiernan, Oak Bluffs, MA (US)

(72) Inventor: John V. Tiernan, Oak Bluffs, MA (US)

(73) Assignee: John V. Tiernan, Oak Bluffs, MA (US)

( * ) Notice: Subject to any disclaimer, the term of this patent is extended or adjusted under 35 U.S.C. 154(b) by 1277 days.

(21) Appl. No.: 13/833,845

(22) Filed: Mar. 15, 2013

(65) Prior Publication Data

US 2014/0143354 A1 May 22, 2014

Related U.S. Application Data

(60) Provisional application No. 61/728,369, filed on Nov. 20, 2012, provisional application No. 61/767,514, filed on Feb. 21, 2013.

(51) Int. Cl.
*H04L 12/58* (2006.01)

(52) U.S. Cl.
CPC .............. *H04L 51/04* (2013.01); *H04L 51/32* (2013.01)

(58) Field of Classification Search
CPC ...................... H04L 51/32; H04L 51/04–51/18
See application file for complete search history.

(56) References Cited

U.S. PATENT DOCUMENTS

| 6,163,607 | A  | * | 12/2000 | Bogart | H04M 3/5233 379/265.02 |
| 2004/0210475 | A1 | * | 10/2004 | Starnes | G06Q 10/105 705/320 |
| 2006/0101098 | A1 | * | 5/2006 | Morgan | H04L 29/06027 |
| 2009/0319516 | A1 | * | 12/2009 | Igelman | G06Q 30/02 |
| 2010/0254527 | A1 | * | 10/2010 | Addair | H04M 3/5233 379/265.12 |
| 2011/0055207 | A1 | * | 3/2011 | Schorzman | G06F 17/30699 707/723 |
| 2011/0258467 | A1 | * | 10/2011 | Antoci | G06F 1/1632 713/310 |
| 2012/0095978 | A1 | * | 4/2012 | Levin | G06Q 30/02 707/706 |
| 2012/0157127 | A1 | * | 6/2012 | Ferren | G02B 13/0065 455/456.6 |
| 2013/0223609 | A1 | * | 8/2013 | Fagundes | H04M 3/465 379/265.02 |

* cited by examiner

*Primary Examiner* — Clayton R Williams
(74) *Attorney, Agent, or Firm* — Onello & Mello, LLP

(57) ABSTRACT

Described are systems and methods that receive from a virtual concierge system a text-based inquiry from a user having an interest; store the inquiry in a queuing system, generate a match between an online assistant and the user based on content of the stored inquiry and profile data of the online assistant, and establish a text-based communication between an electronic device of the user and an electronic device of the online assistant in response to generating the match, the text-based communication including the content of the stored inquiry.

20 Claims, 19 Drawing Sheets

VIRTUAL CONCIERGE SYSTEMS AND METHODS

RELATED APPLICATIONS

This application claims the benefit of U.S. Provisional Patent Application No. 61/728,369 filed on Nov. 20, 2012 and U.S. Provisional Patent Application No. 61/767,514 filed on Feb. 21, 2013, the content of each of which is incorporated herein by reference in its entirety.

FIELD OF THE INVENTION

The present invention relates generally to electronic communications in a hospitality environment, and more specifically, to virtual concierge systems and methods.

BACKGROUND

A hotel concierge is a valuable resource to guests unfamiliar with the hotel where the guest is staying and its surroundings, and who are in need of more information, directions, reservations, local knowledge, dining suggestions, and so on.

Hotels often fail to provide the resources for a concierge to provide productive guest services. In smaller hotels, inns, motels, or related establishments with an efficient lobby that run more similar to a motel or inn, the role of the concierge is often the first position to be reallocated into the job description of another person, like the front desk clerk. Other limiting factors can include but not limited to, limited operating budgets, specifically labor allocations, physical space in the lobby, availability of a reliable, knowledgeable, and informed individual, the availability of the human concierge, limited to questions and guest help when guest is physically present in the lobby, limited by concierge office hours, 8 hour shift, typically, limited by advertising dollars, consequently offering authentic advise directed by advertiser relationships, limited by subjective apprehension, guests less likely to ask personal questions to another person face to face.

An establishment guest can have an abbreviated and often unsatisfactory experience, due at least in part to these limiting factors, resulting in the guest's inability to explore the hotel's general location with advanced knowledge because of the lack of informed guidance.

BRIEF SUMMARY

In one aspect, provided is a computer-implemented method, comprising: receiving from a virtual concierge system a text-based inquiry from a user having an interest; storing the inquiry in a queuing system; generating a match between an online assistant and the user based on content of the stored inquiry and profile data of the online assistant, the online assistant identified for addressing the user interest according to an understanding of subject matter of the content; and establishing a text-based communication between an electronic device of the user and an electronic device of the online assistant in response to generating the match, the text-based communication including the content of the stored inquiry.

In an embodiment, generating the match includes comparing the content of the stored inquiry and the profile data of the online assistant.

In an embodiment, the user or a third party user reviews the profile data and generates the match by selecting the online assistant from a plurality of online assistants.

In an embodiment, the subject matter of the content includes at least one of local knowledge and tips, restaurants, activities, emergency information, maps, directions, or financial information.

In an embodiment, the computer-implemented method of claim 1 further comprises monitoring the text-based communication; identifying, by the virtual concierge system, at least one keyword in the content; and performing an action corresponding to the identified at least one keyword.

In an embodiment, the action includes generating a message that includes content related to the at least one keyword.

In an embodiment, the action includes outputting the at least one keyword to a marketing tool.

In an embodiment, the computer-implemented method further comprises forwarding, by the virtual concierge system, the inquiry to an electronic device of a manager in response to a failure by the online assistant to participate in the text-based communication with the user in a predetermined period of time; and generating, by the manager, the match that includes another online assistant.

In an embodiment, the computer-implemented method further comprises sending, by the user, a voice communication to the virtual concierge system; and generating, by the virtual concierge system, a text message informing the user that text communications are proper communications.

In an embodiment, the text-based communication is performed over a social networking service.

In an embodiment, generating the match includes determining a weight score from characteristics and preferences determined from the content of the stored inquiry and the profile data.

In an embodiment, the computer-implemented method further comprises determining statistics of a plurality of online assistants in communication with the virtual concierge system to at least one of determine which online assistant receives the most accepted responses, which online assistant posts the fastest response times, which online assistant receives the highest feedback rating, or which online assistant answers the most text inquiries from guest users.

In an embodiment, the method further comprises generating a revenue stream according to at least one of operator rating statistics, inquiry statistics, or response time statistics.

In an embodiment, generating the match comprises: assigning each online assistant registered with the virtual concierge system a value corresponding to personal information of the online assistant; displaying a menu at the electronic device of the user that includes questions related to user preferences; providing, by the user, answers to the questions; assigning an indexed value to each answer; and comparing the indexed value to the value assigned to the each online assistant registered with the virtual concierge system.

In another aspect, provided is a method, comprising: introducing a hotel guest to a virtual concierge system; and directing via the virtual concierge system an interest-related inquiry of the hotel guest to an online agent according to profile data of the agent, the profile data including data identifying knowledge of the interest.

In an embodiment, method of further comprises monitoring a text-based communication between the hotel guest and the agent established in response to detecting the interest-related inquiry; and performing an action corresponding to content in the interest-related inquiry.

In another aspect, provided is a guest communication system, comprising: a text-messaging interface that establishes a communication with at least one of a guest user and an online assistant; a profile module that includes data corresponding to subject matter knowledge of the online assistant; and an indexing engine that generates a match between the online assistant and the user based on content of a text-based inquiry made the user and the profile data of the online assistant.

In an embodiment, the guest communication system further comprises a storage device for storing the profile data, the content of the text-based inquiry, and a text-based communication between the guest user and the online assistant.

In an embodiment, the guest communication system further comprises an interface for providing the text-based communication over a social networking service.

In an embodiment, the guest communication system further comprises an interface for outputting elements of the content to a marketing tool.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
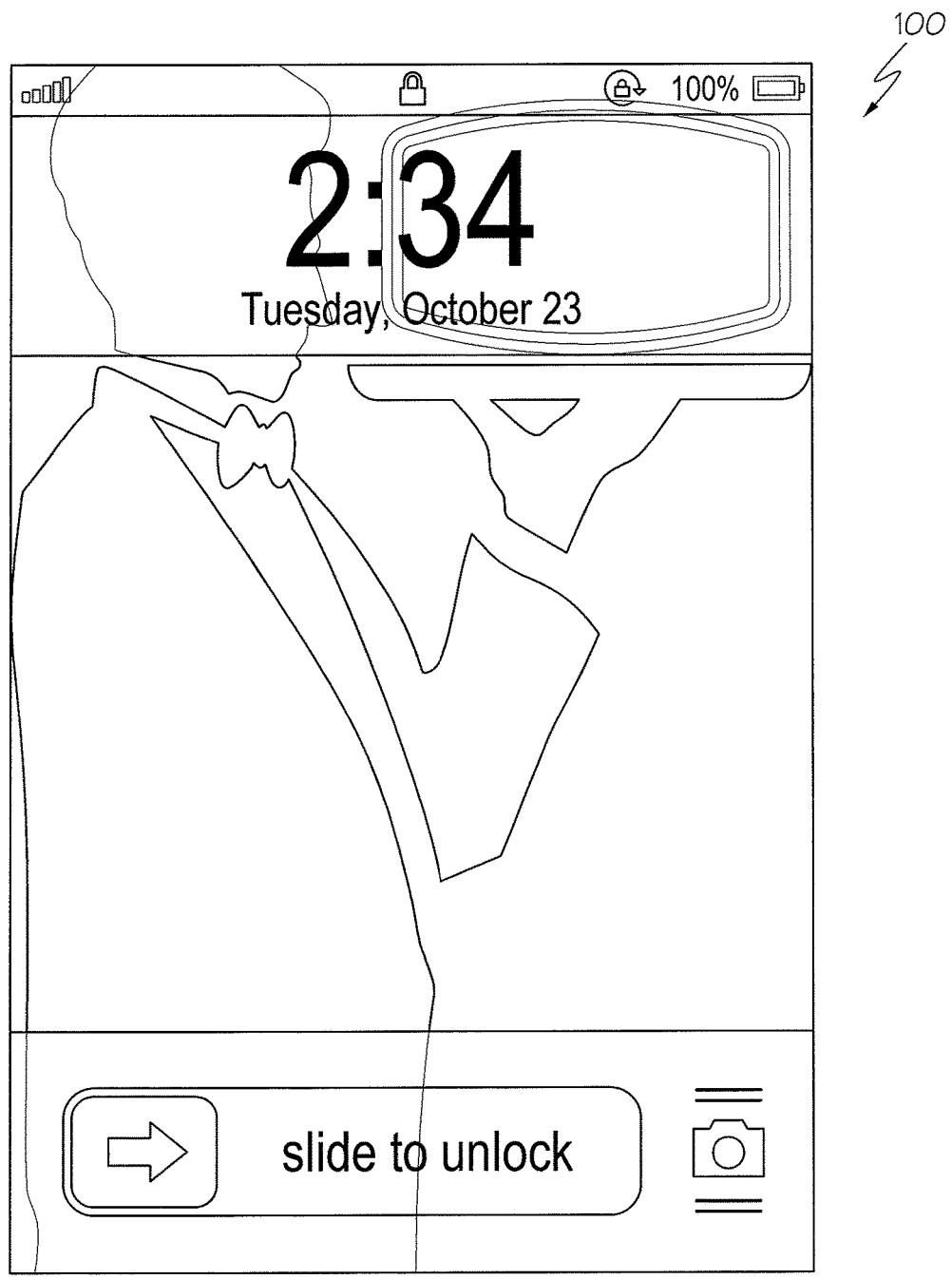
FIG. 1 is a screenshot of an electronic image corresponding to a virtual concierge, in accordance with an embodiment.

In the following description, specific details are set forth although it should be appreciated by one of ordinary skill that the systems and methods can be practiced without at least some of the details. In some instances, known features or processes are not described in detail so as not to obscure the present invention.

The virtual concierge systems and methods in accordance with embodiments are not intended to be limited to the software and hardware described in the embodiments herein. The illustrations of the virtual concierge system shown herein are intended to provide examples with respect to the sequence of interactions and the exchange of information between one or more guest users, the virtual concierge system, and one or more operators available to provide concierge-related assistance to the guest users. In an embodiment, a mode of communication includes the exchange of electronic data, such as a short message service (SMS) or other real-time or near real-time text messaging service. Alternatively, speech recognition tools can be readily available to convert voice into data for transmission via a short message service (SMS) or other real-time or near real-time text messaging service. Accordingly, the exchange of information between the various parties in communication with a virtual concierge system can occur in the absence of real-time voice communications.

The virtual concierge system can be part of a centralized computer, which controls, manages, and directs the exchange of SMS messages or the like between an electronic device of a person in a position to assist the user, for example, a system operator, who preferably has sufficient knowledge to assist a guest user, and an electronic device of the guest user. Accordingly, the system operator can serve as a human concierge without being physically accessible in a hotel lobby. The knowledge of the system operator can be used to establish a personal, viable interaction with a guest user requiring assistance, similar to a traditional lobby-based concierge, except that the concierge in accordance with embodiments can be at a different location and can nevertheless provide comparable assistance based on personal, or expert, knowledge of the subject matter of interest.

In a typical hotel registration process, a guest checks into the hotel, and undergoes the protocol of signing a registration form, receiving a room key, and so on. A registered guest is typically provided by a hotel employee with a verbal overview of the hotel, and is informed of the hotel's respective policies. In an embodiment, the guest is introduced to a virtual concierge system, also referred to herein as a guest communication system, which includes features related to a virtual concierge, for example, described herein. The virtual concierge can be provided a universal pen name, or enter a pen name from the user's electronic device, for branding the system and any services provided by the system. For example, the virtual concierge can be entitled "Loomis," which is a classic old English name, intending to take on the persona of an old English butler. Guests can be given a business card with a short description of the virtual concierge program. An account can be established for the guest, which includes information such as the room number, phone number, etc. Guests can be provided with a phone number that corresponds to the virtual concierge, which facilitates text messaging with system operators also in communication with the virtual concierge. Guests can be encouraged to add the given phone number to their electronic device, e.g., cellular phone, and reminded that the guest communication system is an SMS/texting system.

The guest communication system in accordance with some embodiments serves as a virtual concierge to effectively act as a personal concierge to all guests who are looking for local information and tips. Although the guest communication system itself does not provide the local information, the guest communication system establishes a communication between a guest seeking assistance and an operator who is also in communication with the guest communication system and can assist the guest. A hotel representative, such as a manager, can select a system operator for a guest with an inquiry, for example, based on profile information indicating that the system operator is sufficiently knowledgeable in the subject matter identified by the guest, for example, local restaurants. Alternatively, the virtual concierge system can automatically establish a match by comparing contents in a text based inquiry sent by a guest and the system operator profile data.

The guest communication system can be constructed and arranged for operation in other industries outside of the hospitality industry. The concept of connecting operators who are subject area experts with guests or other users seeking the respective knowledge of the operator through a streamlined mobile communication system can be highly beneficial for the user and profitable for the parent company or other establishment managing the system and offering virtual concierge services, for example, described herein. In sum, the guest communication system is an efficient and marketable way of matching users with questions to those having knowledge with respect to the subject matter of the user questions.

From the perspective of a hotel operator's perspective, a guest, and/or a stringent and responsible business owner, the well-known use of a human concierge presents a number of limitations that are passed on to the guests, are realized by the owner, and are the responsibility of the hotel operator. The virtual concierge system in accordance with some embodiments effectively overcomes those aforementioned limitations, and most notably simplifies the guest communication system through the efficient nature of the system.

Driven by a data communication system that interfaces with SMS or other text-based communication systems on a smartphone, electronic notepad, laptop computer, or related electronic device, the guest communication system can perform a virtual role by fielding and responding to guest questions provided by system operators in communication with the system in an un-biased, un-solicited nature, 24 hours a day, and in a timely manner, and with a great amount of local knowledge and understanding.

Each registered system operator's areas of interest, age, music choices, short blurbs on personality, general views on issues, languages spoken, favorite places, place of birth, etc. can be recorded and framed to create detailed profiles on each system operator. This in-depth profile allows each guest to choose their respective system operator for reasons of similarity, common likes, languages spoken, etc.

The guest communication system in accordance with some embodiments removes the physical need for significant space in a hotel lobby, which typically includes a space-consuming concierge desk. The guest communication system can also reduce general and administrative costs associated with training and maintaining another physical employee in the building, given that the operator of the system works remotely and on a stipend or text quantity system. Hotels with large and growing groups of readily-available system operators, often in larger cities, can provide a virtual concierge kiosk, for example, at a computer area of a hotel, allowing guests to shop for their preferred system operator just after the 'check-in' step of the hotel guest sequence. Ideally this kiosk area would include a computer or two, giving guests the chance to shop the software for a system operator that fits well with their needs and wants. Alternatively, a guest can be provided with a temporary use of a smartphone, tablet device, or related electronic device having a display, which can be preconfigured with access to the guest communication system, for example, permitting the guest user to select a personal "concierge" from a displayed list.

The virtual concierge system can also remove any person-to-person apprehension regarding the nature of a guest question, accepted on the pretense that human beings are more apt to ask an honest or uncomfortable or personal question if the responder is anonymous.

Another feature is that the guest communication system can capture data of a text exchange between guests and system operators. This data can be stored, organized, processed, and provided to a third-party entity, such as a market research company. For example, data can be gathered that establishes how many guest users prefer a particular restaurant, a type of meal, a particular shoe store, and so on. This information can be provided to a market research company.

FIG. 1 is a screenshot of an electronic image 100 corresponding to a virtual concierge, in accordance with an embodiment. The electronic image 100 can relate to a home screen or background image that is displayed at a system operator computer screen. The image 100 can be displayed on a smartphone, laptop, or other electronic device having at least a display and a network interface. An operator can view the image 100 when operating in a static, non-responding mode. A virtual concierge user can also view the image 100, for example, on branding materials for the virtual concierge system, described herein.

Figure 2:
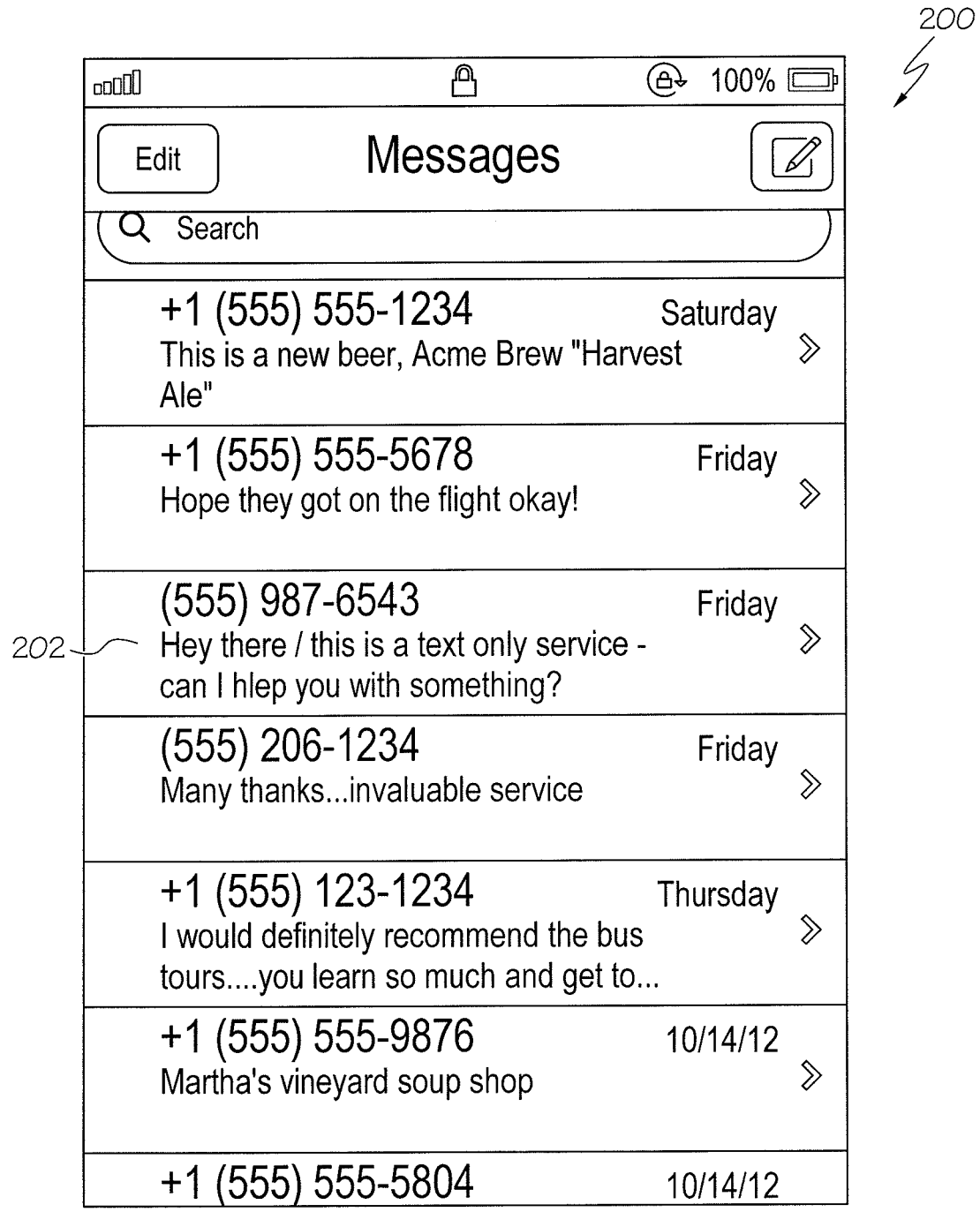
FIG. 2 is a screenshot of a displayed list of messages exchanged between a virtual concierge user and a system operator, in accordance with an embodiment.

FIG. 2 is a screenshot of a list of messages 200 displayed on a system operator smartphone display, and exchanged between a virtual concierge user and a system operator, in accordance with an embodiment. The messages 200 can be displayed as SMS messages or the like. In an embodiment, the messages 200 can be displayed on a system operator's electronic device as a set of guest inquiries. A guest inquiry can include the guest's phone number, email address, or other identification, which can be provided during a hotel check-in or user online registration process. The guest inquiry can also include a timestamp, which can indicate to the system operator the timing of response as well as the urgency of the response. The messages 200 can alternatively illustrate an SMS or other text exchange between a guest user and a system operator assisting the guest user. Messages, such as message 202, can be stored and automatically generated, for example, at the time of registration when an account is established for a new guest at the guest communication system.

In an embodiment, when a guest user sends a text message to the guest communication with a question, and the question is temporarily stored in a queue relative to the time received, for example, a first in-first out order. A system operator can retrieve questions from the queue, one at a time, and answer the guest questions in the order they were received. The system operator can answer all questions received in the queue barring the question is inappropriate in nature or is morally questionable. In this case, the operator can politely inform the guest accordingly, in a text response.

All questions can be instantly texted to a plurality of system operators in communication with the virtual concierge system, also referred to herein as a guest communication system. For example, a system operator can log into the system as an indicator that that the operator is available to assist guest users with inquiries made via the virtual concierge. Alternatively, a system operator can submit a status to the virtual concierge that the system operator is unavailable. Here, a system operator who is not signed into the virtual concierge system is unavailable to receive texts via the system.

As previously described, during operation, a guest user inquiry made via the virtual concierge system can be placed in a queue. The first operator to answer the question can automatically prevent the question from being processed, i.e., pulled from the queue and answered by another operator, unless the guest responds "unsatisfied" when prompted by the text system. An automated message such as "did I help" or "see next operator" may be presented automatically after each question answered. The guest communication system is constructed and arranged with built in tracking applications that can measure and quantify which system operator receives the most accepted responses, which operator posts the fastest response times, which operator receives the highest feedback rating, and/or which operator answers the most texts in totality.

Figure 3:
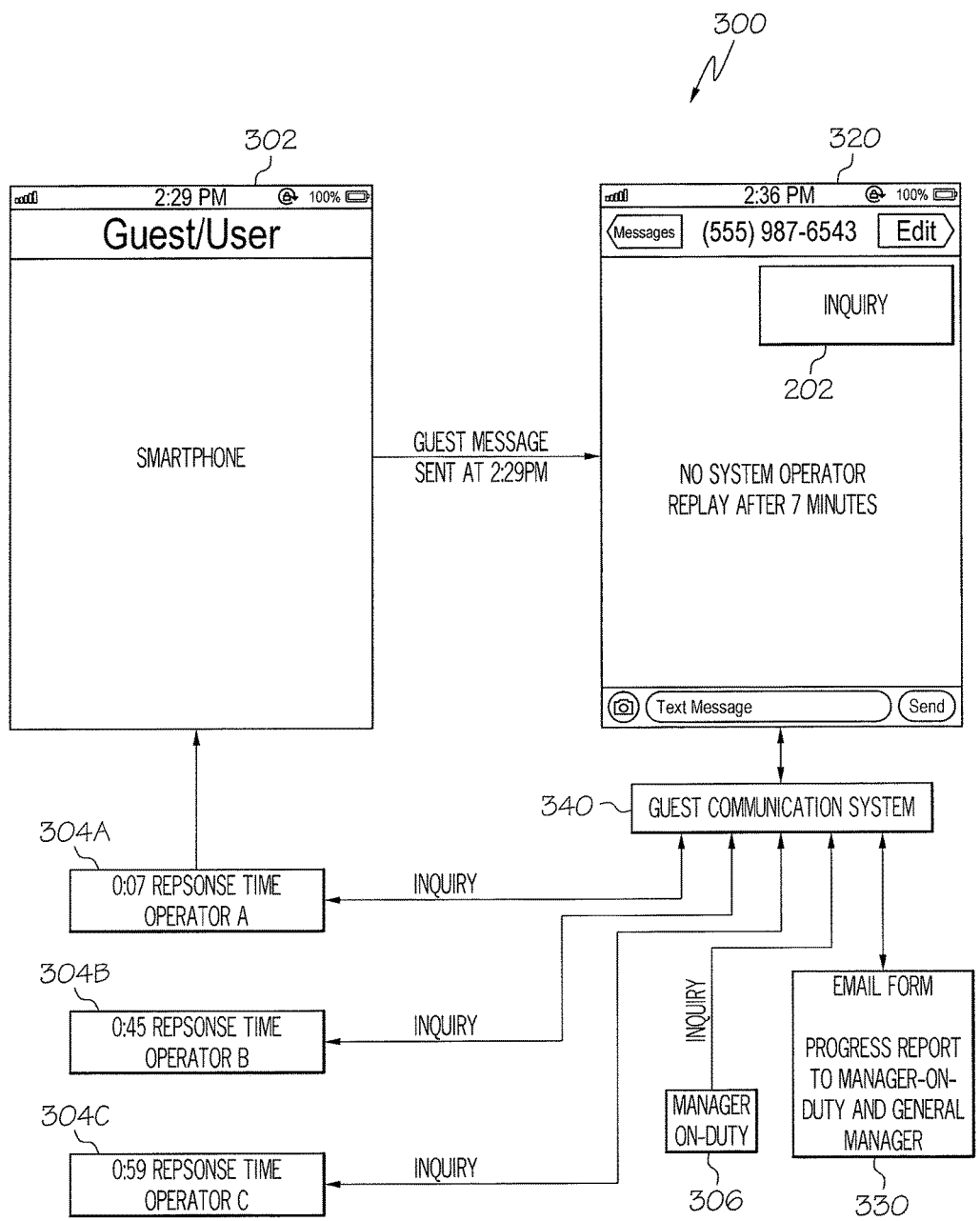
FIG. 3 is a diagram of an environment illustrating an example of an interaction between parties to a communication facilitated by a guest communication system, in accordance with an embodiment.

FIG. 3 is a diagram of an environment 300 illustrating an interaction between parties of a communication exchange facilitated by a guest communication system 340, in accordance with an embodiment. The parties can include a guest user 302, a plurality of operators 304A, 304B, 304C (generally, 304), and a third party user such as a hotel representative 306, for example, a manager on duty. The parties 302, 304, 306 can communicate with the guest communication system 340 via an electronic device such as a smartphone or a personal computer. A guest user 302 can send (1) via the guest communication 340 an SMS text message or the like to a selected system operator selected, for example, at 2:29 P.M. Available operators 304 have the ability to respond to the question, at various response times, for example, 0:07, 0:45, and 0:59 minutes after receiving responses, respectively. Alternatively, a guest user 302 may request a particular operator 304. The guest communication system 340 can be configured to forward (2) the text message to the manager on duty 306 after a predetermined period of time, for example, 7 minutes after the text message is first sent to the selected system operator 304. An email report 330 can be forwarded to the manager's email account with details of the guest user 302 waiting on a reply from the selected system operator 304. The manager's phone 306 can be configured with security permissions to redirect (3) via the guest communication system 340 the text message to a group of available system operators 304A-304C (generally, 304) for responding. The first operator 304 to respond maintains a conversation with the guest user 302 from that point forward.

Figure 3A:
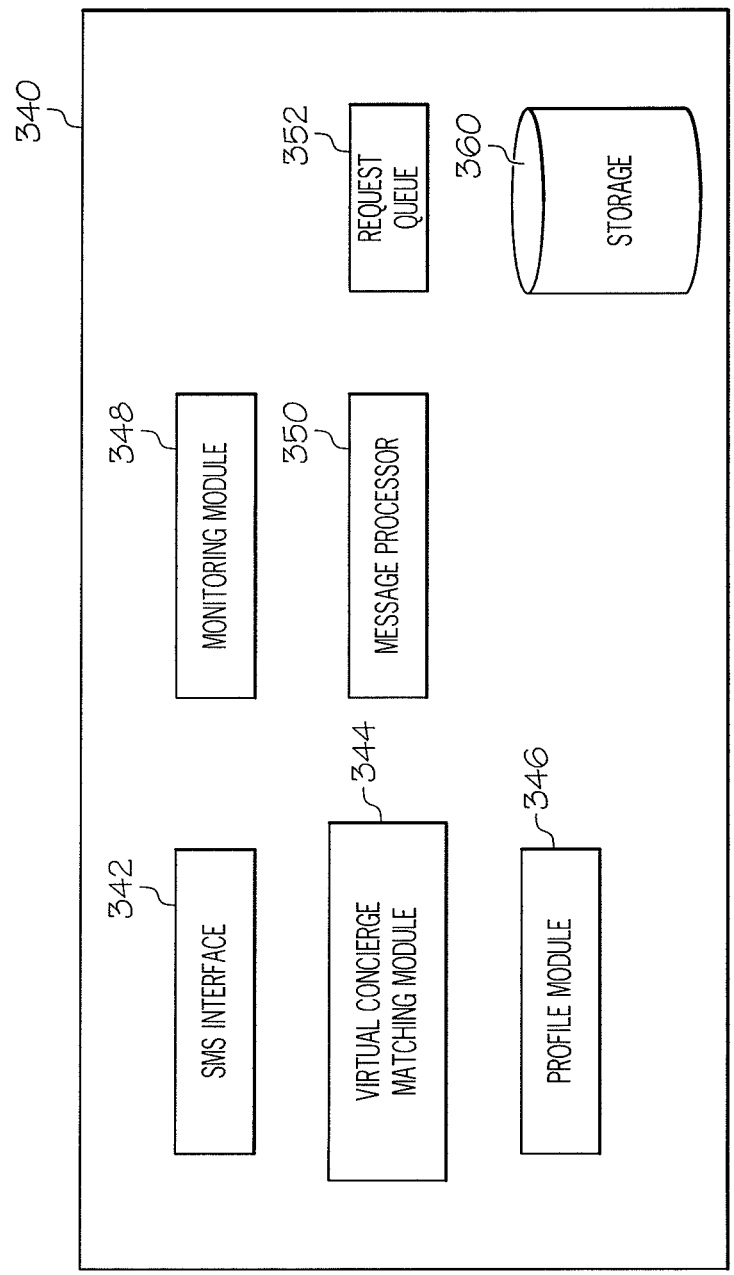
FIG. 3A is a block diagram of the guest communication system of FIG. 3.

FIG. 3A is a block diagram of the guest communication system 340 of FIG. 3. The guest communication system 340 can include a processor such as a CPU 22, a memory, and an input/output (I/O) logic, for example, including a network interface card (NIC), which communicate with each other, or other computers, such as a hotel registration system, a market research computer, data statistics generator, and so on, via a data/control bus and/or data connector, for example, a peripheral component interconnect (PCI) bus. The I/O logic can include one or more adaptors for communicating with a network. The guest users 302 and operators 304 can communicate via their electronic devices with the system 340 across the network, for example, a wireless network, a data network, or other communication network known to those of ordinary skill in the art.

The memory of the guest communication system 340 can include volatile memory, for example, random access memory (RAM) and the like, and/or non-volatile memory, for example, read-only memory (ROM), flash memory, and the like. The memory can include removable and/or non-removable storage media implemented in accordance with methods and technologies known to those of ordinary skill in the art for storing data. Stored in the memory can include program code, such as program code of an operating system (OS), as well as an SMS interface 342, a virtual concierge matching module 344, a profile module 346, a monitoring module 348, a message processor 350, a request queue 352, and a storage 360, which can be executed by the processor of the guest communication system 340. Some or all of these elements can be collocated under a single hardware platform. In other embodiments, some or all of these elements can be on different hardware devices, and communicate with each other via the network.

The SMS interface 342 can communicate with end-user devices such as smartphones and/or other elements of a text-message communication network such as an SMS server. Although an SMS interface 342 is shown and described, the mode of communication is not limited to SMS. Other messaging protocols can equally apply such as a multimedia messaging service (MMS). The SMS interface 342 can exchange text messages between guest user devices 302 and system operator devices 304 by calling a phone number provided by the guest communication system 340.

The virtual concierge matching module 344 receives inquiries, preferably in the faun of text messages, from one or more guest users 302, and can store the inquiries in the request queue 352. The virtual concierge matching module 344 can include a timer that monitors the amount of time from a system operator 304 receives a guest message, and the time that the system operator 304 responds to the message. In an embodiment, the virtual concierge matching module 344 can establish communications with an interactive television or related display-based electronic device so that a guest can program a virtual concierge account on the matching module 344, with personal information, in lieu of a hotel representative performing this operation. The virtual concierge matching module 344 can also be configured to permit a guest user to select a system operator from the room television, or select options as to ordering a type of virtual concierge service, for example, a service offering a predetermined number of minutes or text messages.

The matching module 344 can also compare operator profile data with guest user data to establish a match between the system operator and the guest user. A match can be based on a number of chosen variables, such as age, language, interests, as well as a number of other subjective traits.

The matching module 344 can include an indexing engine that generates a weight value pertaining to certain characteristics and preferences and generate a match in accordance with results according to the weighted characteristics or preferences.

The profile module 346 can generate detailed profiles on each system operator, for example, personal information, areas of interest, subject matter expertise. The profile data can be used by a guest user when selecting a system operator for reasons of similarity, common likes, languages spoken, etc.

The monitoring module 348 can monitor communications between one or more guest users 302 and one or more system operators 304. The monitoring module 348 can identify contents in the communications, such as relevant keywords from an inquiry, and output results to the storage device 260 and/or to an interface for transmission to a marketing tool, a social networking service, or other processor for processing this data, for example, the message processor 350.

The message processor 350 can generate email messages or the like for output to third party audiences, i.e., parties other than guest users and remote concierges. Such messages can include content derived from communication exchanges between users 302 and operators 304.

Figure 4:
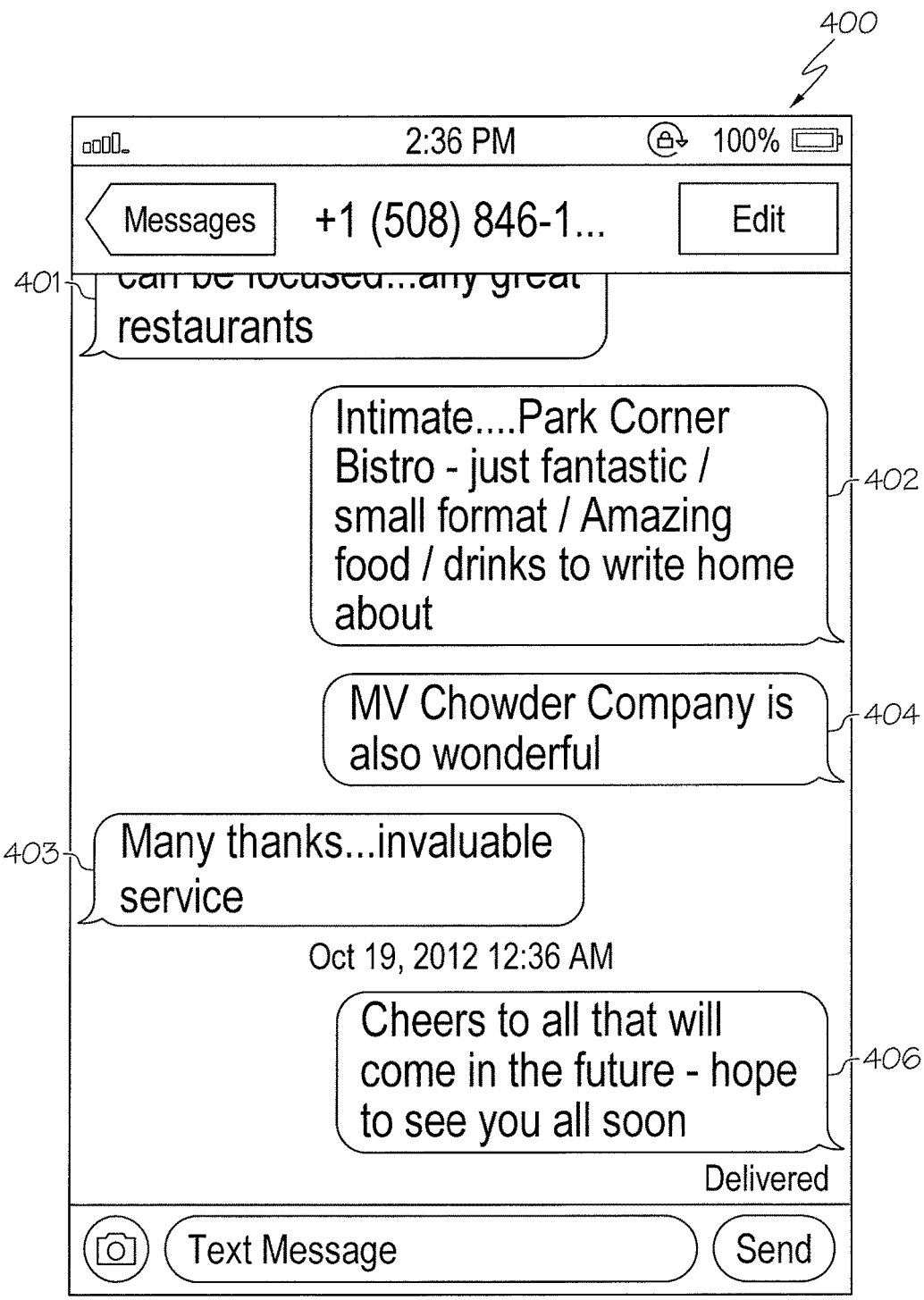
FIG. 4 is a screenshot of a display screen illustrating a communication exchange between a guest and a system operator, in accordance with an embodiment.

FIG. 4 is a screenshot of a display screen 400 illustrating a communication exchange between a guest user and a system operator, in accordance with an embodiment. Displayed is a set of questions or comments 401, 403 provided by a guest user 302, and a set of operator replies 402, 404, 406.

Once a text exchange is initiated via the guest communication system 340, the guest user 302 can continue to submit questions, inquiries, and so on to the system 340 for the duration of a stay at the establishment. The guest communication system 340 can communicate with a hotel reservation system, data repository, or other system so that the system 340 can retain information regarding the guest 302 in the event that the guest 302 returns to the establishment for future stays. The guest 302 can submit questions, inquiries, and so on to the system 340 when returning home after a stay at the establishment, for example, to inquire about future reservations, lost items, or local questions. These questions, etc. can be first forwarded to a representative, for example, front desk staff, rather than an available system operator so that system operators are not responsible for responding to guests who have checked out. The system 340 can be constructed and arranged to instruct the virtual concierge matching module 344 to send an automatic response to the guest at a particular time, for example, at 12 pm on the day of check out with a message such as "Thanks for the stay. Please review me on trip advisor . . . or anything else"

Figure 5:
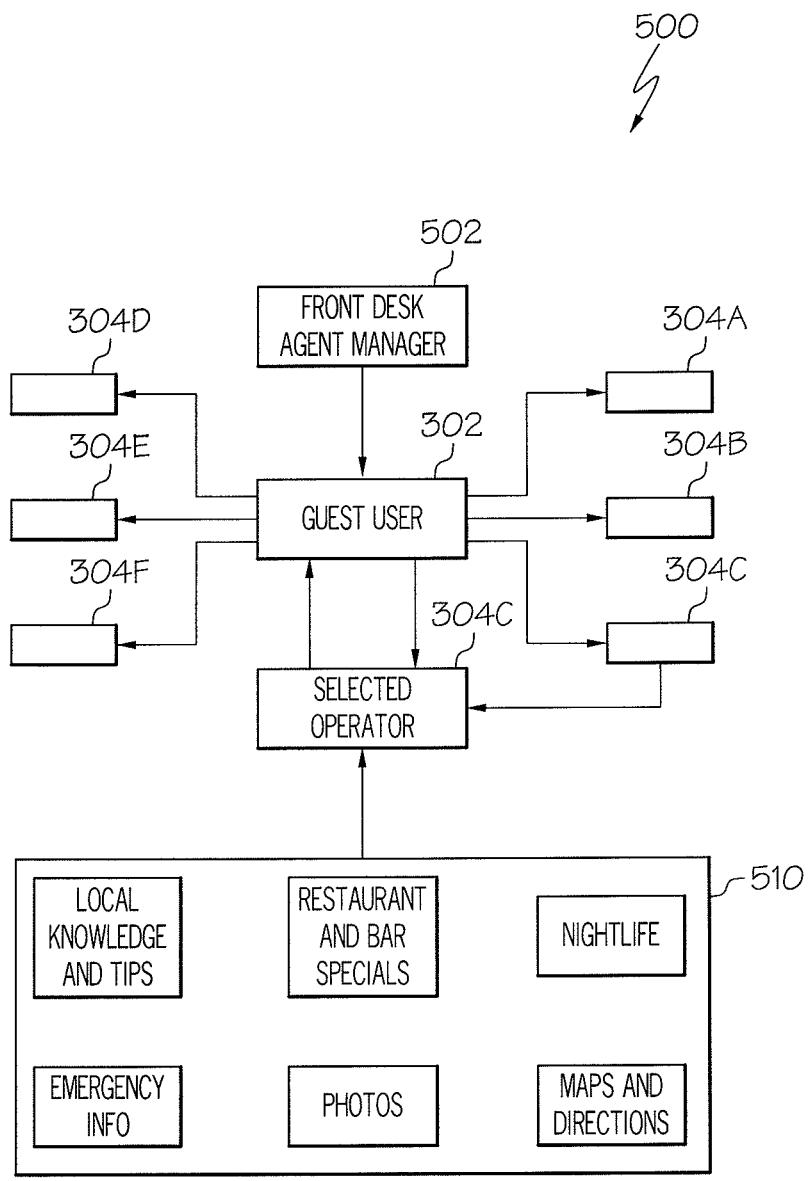
FIG. 5 is a flow diagram illustrating a selection of a system operator and an exchange of information in an environment in which a guest communication system is implemented, in accordance with an embodiment.

FIG. 5 is a flow diagram 500 illustrating a selection of a system operator and an exchange of information, in accordance with an embodiment.

A front desk agent 502 or other representative can introduce a virtual concierge service to a guest user 302, for example, when checking into the hotel. Alternatively, a guest user 302 can register with the virtual concierge service in the room, for example, using an interactive television, telephone, computer, or other electronic device used for accessing guest communication system 340. Some or all of the functions of the virtual concierge service can be performed by the guest communication system 340 described at least in FIGS. 3 and 3A. The agent 502 can operate a computer to establish an account for the guest user 502 and/or provide the guest user 502 with other services related to the virtual concierge service, for example, selecting a system operator 304C from a plurality of system operators 304A-304F (generally, 304). The agent 502 can be presented with a screen, button, or other display for selecting the system operator 304C. The agent 502 can also be provided with buttons, screens, etc. for changing system operators 304 at any time, or on a predetermined basis, for example, daily, or in accordance with an online calendar that provides operator work schedules. System operators 304 can provide access information, for example, a personal telephone number for receiving text messages, so that guest inquiries can be redirected from the guest communication system 340 to the operator phone 304.

The guest user 302 can be provided with information from the agent 502 on how to access and use the virtual concierge system and then initiate an SMS text message to virtual concierge system's pen name, e.g. "Loomis." A pen name can be established by the guest user, or by the system administrator, or other authority of the system, along with other guest information such as room number, contact information, and so on. A system operator 304 can assume the role of the virtual concierge, i.e., the persona of 'Loomis', and respond to an inquiry made by the guest user 302. For example, the guest user 304 can select Loomis C 506C for a particular area of expertise 510. This can be performed either at check in, at a remote kiosk desk, on the interactive TV screen or by the guest user choosing a personal system operator from an in room welcome book.

A guest user 302 can 'shop' for a system operator 304C from a group of available system operators 304 to serve the guest user 302 at the time and date of check-in, or during a stay.

Figure 6:
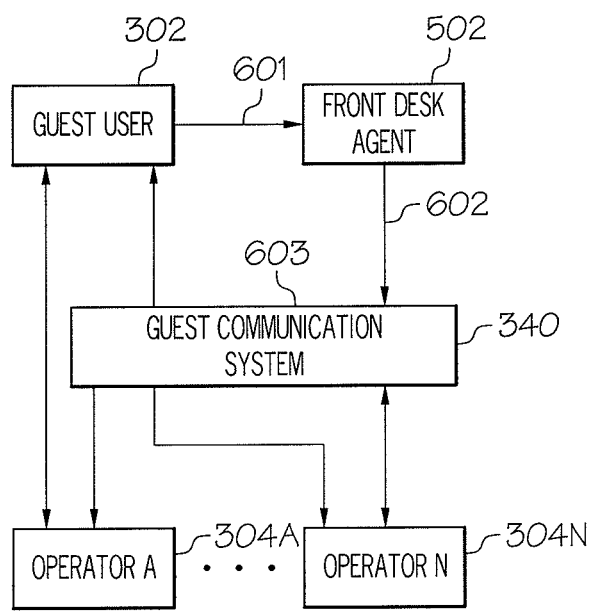
FIG. 6 is a flow chart showing the process of selecting a system operator and the matching of user to a system operator, in accordance with an embodiment.

FIG. 6 is a flow chart showing the process 600 of selecting a system operator and establishing a match between a guest user and a system operator.

At step 601, a guest user 302 is introduced, for example, by a front desk agent 502, to the virtual concierge, e.g., "Loomis", upon check in at the hotel. The guest user 302 can be provided an option as to whether the user would like to be "virtually welcomed," for example, a text message stating "Welcome to the Inn. Your virtual world of Loomi are now standing by to answer your questions."

At step 602, the front desk agent 502 can enter the cell phone number and/or other relevant information of the participating guest 302 into the guest communication system 340, after which a prerecorded text message, e.g., "Welcome" or the like can be output to a display of the guest device 302.

At step 603, the guest communication system 340 can direct all responses from at least one system operator 304A through 304N (generally, 304), where N is an integer greater than 1, assigned by the hotel. A pull down menu can choose one or more Loomi or have a "select all" button or a guest can communicate via a concierge kiosk, choose when making an online reservation or using an interactive television. Different system operators 304 may be selected for different guests 302, for example, matched according to a common foreign language, area of interest, age demographic, and so on. Matching can be performed automatically by the system or by a hotel representative or other human operator. The guest communication system 340 can automatically generate a "goodbye" message upon checkout. In an embodiment, the guest communication system 340 can include a timer that monitors the amount of time from a system operator 304 receives a guest message, and the time that the system operator 304 responds to the message. The guest communication system 340 can monitor and identify any words in a text exchange that the hotel deems unacceptable, e.g., terms such as "prostitution" or "drugs." An email alert, for example, described with respect to FIG. 3, can be sent to a hotel third party user such as a virtual concierge system administrator, representative, manager, owner, or the like if questions are flagged or remain unanswered, for example, during a predetermined period of time. The program will have one constant phone number and "Loomi" phone numbers are easily programmable and selected from a drop down determined by desk clerk.

A particular system operator, for example, 304A, may be fluent in Spanish and have insider knowledge on local art, music or history in the particular location. The front desk clerk 502 may have a pull down menu displayed at the clerk's computer, and can determine on an individual basis that a guest user 302 can use only system operator 304A if the guest user 302 only speaks Spanish. Here, an administrator can highlight only system operators, i.e., 304A, who speak Spanish, and the system 340 is configured to ignore all other operators 304 registered with the system 340.

In another example, system operator 304N may be the current concierge on duty. The guest communication system 340 and be configured to change phone numbers based on concierge work schedules, or a manager may decide to reward or assign particular hotel staff with specific duties, for example, "concierge for the day," in order to provide efficiency and a minimum necessary number of system operators 304 available to assist guest users 302.

Figure 7:
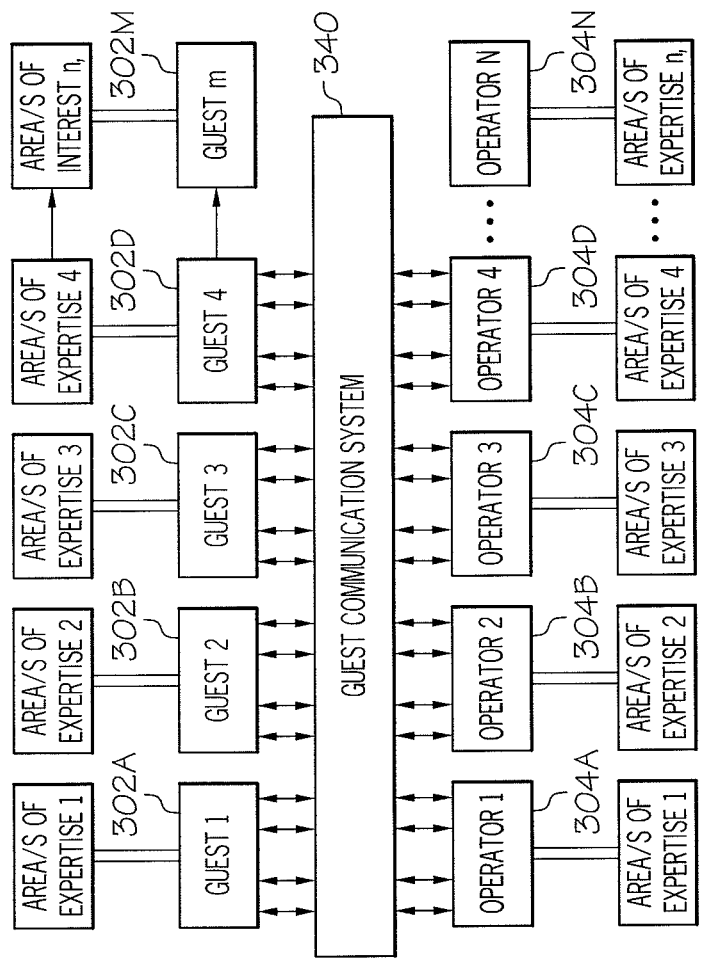
FIG. 7 is the diagram illustrating a guest communication system establishing a match between a system operator and a guest, in accordance with an embodiment.

FIG. 7 is the diagram illustrating a guest communication system 340 establishing a match between one or more system operators 304A-304N (generally, 304), and one or more guests 302A-302M (generally, 302), in accordance with an embodiment. A match can be generated by intervention from a hotel representative or other administrator as described in embodiments herein, or automatically generated as described in embodiments herein. The match can be based on a number of chosen variables, such as age, language, interests, as well as a number of other subjective traits. A scenario could be tailored to work with any hotel property in any location. This is a voluntary guest action whereby the guest will either choose a system operator 704 based on those system operators who are available that day to work or if the respective guest does not want to choose the computer will generate the 'best choice' for the guest based on guest interests, basic personal information in the system, and availability of system operators.

The system 340 can establish a match between a guest user 302 and an operator 304 by asking the guest 302 a series of detailed questions about certain likes, dislikes, food choices, travel preferences, age, etc. A guest 302 can choose from a pull down menu to select their choice/answer for each question. To simplify the process and keep the guest 302 focused on choosing the best selection for each question, as well as to keep it feeling less of a 'test' and more of an entertaining experience, there will be one question per screen, the software will feature colors that are in the same family as the colors of the brand/logo. Each answer to a question is given an indexed value. Each question's value is then added up at the completion of the questionnaire and then the computer will take the sum and match that sum with the indexed 'personality value' of an operator 304 available at that time.

For example, a personality value can be determined from a questionnaire such as a personality test that includes personal data such as subject matter interests or knowledge. In this example, the system operator 304 may be asked whether she enjoys meat, chicken, or fish. If she selects meat, then a value can be generated. Also, a value can be automatically generated that she enjoys beer, because it is well-known that meat-eaters typically enjoy beer. The operator 304 can complete such a questionnaire or other test producing a personality value prior to registration with the virtual concierge system, or during an interview process when qualifying the operator 304 for participating as a concierge. The guest 304 can take a similar test, survey, or the like, which produces a score that can be compared to the operator's score. If the sum and the 'personality value' do not exactly or closely match, e.g., values differ by a predetermined margin, but the system 340 will choose those operators 304 who have the closest value to that of the user 302. This can be used by a guest 302 with an electronic display device such as an electronic pad, for example, issued for temporary use by the hotel, for selecting a preferred system operator.

Once the guest user 302 has completed all the questions the system 340 has for the typical operator matching questionnaire, the computer-generated output can include a list of the "Best Possible Matches" with an indexed score rating from top to bottom the most compatible to the least compatible. Each of the computer's choices for best matches will also include a description as to why an operator 304 is a possible match for a given guest 302. For example, an indexed score rating can be used to generate a list of possible matches, which can be displayed at the guest's device.

Figure 8:
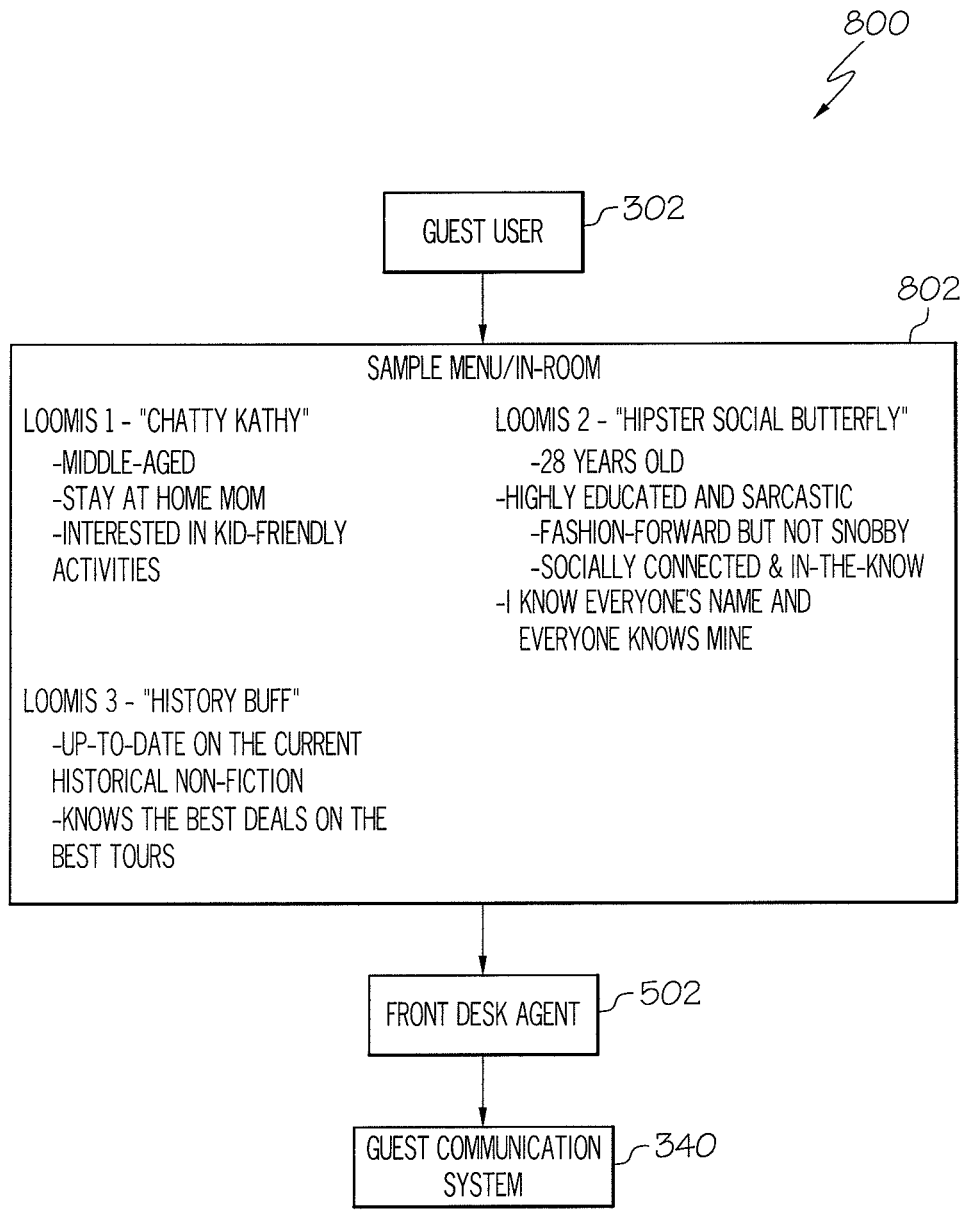
FIG. 8 is the block diagram illustrating the guest interaction process of choosing a system operator from a menu, in accordance with an embodiment.

FIG. 8 is the block diagram illustrating the guest interaction process 800 of choosing a system operator from a menu 802, in accordance with an embodiment. The process 800 can be performed if a guest user 302 foregoes making a decision at a front desk, for example, at the time of registration, and decides to choose a system operator, referred to by its predetermined pen name, Loomis, later in the guest's hotel stay. A guest user 302 can establish a communication with one or more system operators at any time in the guest's hotel stay. The guest 302 can either call down the front desk agent 502 or other hotel representative, choose a system operator, for example, shown in the menu 802 as either Loomis 1, Loomis 2, or Loomis 3. The guest user 302 can select the system operator from a hotel lobby kiosk or other computer location. Alternatively, a guest user 302 can select a system operator by sending an 'open first text' into the guest communication system 340 which is entered into the request queue 352, where the first available system operator, for example, Loomis 2, is provided with the guest account. Once an operator answers the 'open first text', the text is no longer active and the responding system operator is now paired with the guest 302.

The guest communication system 340 can track and profile response times. If a system operator 304 either exceeds the given response time limit, effectively, and does not respond, then the guest user 302 is notified that their system operator has left that system, or is otherwise unavailable, and another 'open first text' can be output to all available system operators to secure the open guest 302.

Figure 9:
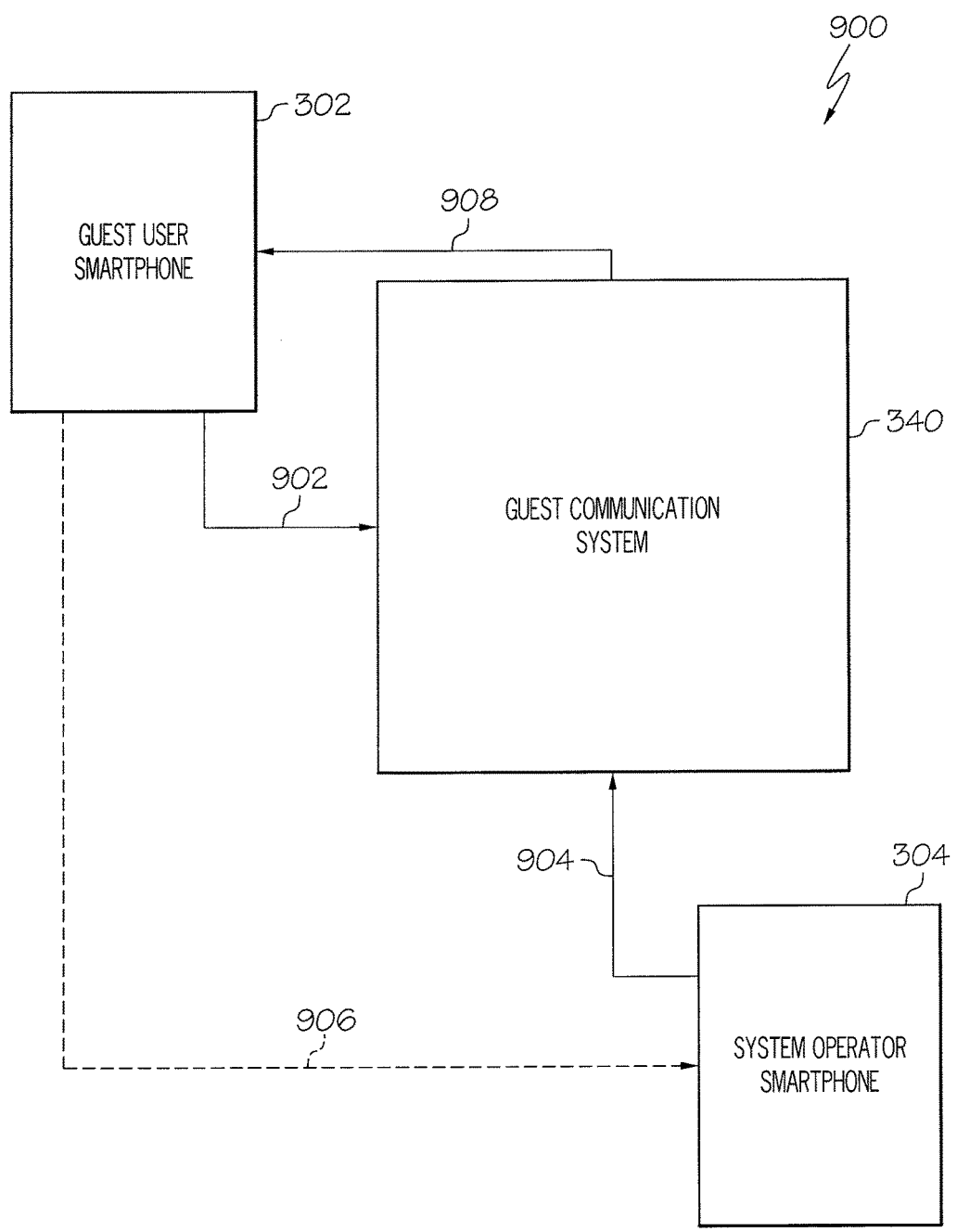
FIG. 9 illustrating a communication facilitated by a guest communication system between a guest user and a system operator, in accordance with an embodiment.

FIG. 9 illustrates a communication 900 facilitated by a guest communication system 340 between a guest user smartphone 302 and a system operator smartphone 304, in accordance with an embodiment. The guest communication system 340 can filter, organize, queue, and/or file text messages, for example, SMS messages, or perform other processing of such messages exchanged between guest users and system operators registered with the guest communication system 340.

During operation, a guest user 302 may send a text message 902 directly to a phone number associated with the guest communication system 340. The guest communication system 340 receives the text message and redirects it to a designated system operator smartphone 304. The system operator smartphone 304 then receives the text message via the guest communication system 340 sent originally from the guest, and can respond 904 to the guest user 302 via the guest communication system 340. This feature prevents the phone number of the system operator smartphone 304 from being publicly available, for security reasons. The guest communication system 340 also allows for tracking, measuring, queuing and automated responding when necessary.

In the event that the system operator 304 places a phone call 906 to the phone number, instead of a text message replies 904, an automated message 908 can be output from the guest communication system 340, for example, after two rings, to remind the guest user 302 that the virtual concierge service provided by the guest communication system 340 is a text-based communications, for example, SMS-compliant, and not designed for voice communications.

Figure 10:
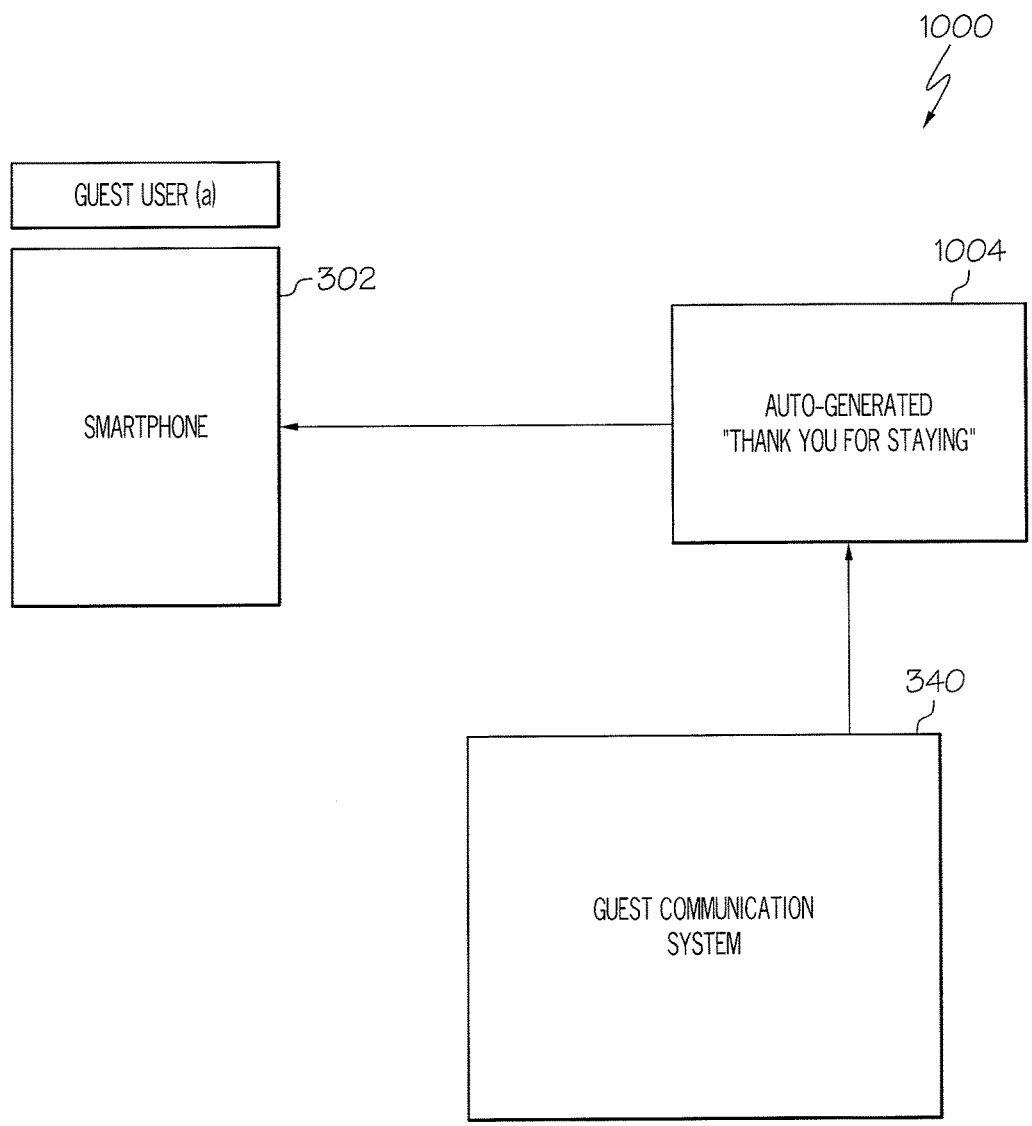
FIG. 10 is a diagram illustrating a checkout process, in accordance with an embodiment.

FIG. 10 is a diagram illustrating a checkout process 1000, in accordance with an embodiment. An automatic message and customized message 1004 can be generated, i.e., "Thank You for Staying," which can be generated by the guest communication system 340 at the time of a checkout by the guest user 302. A set of such messages can be stored at the storage 360, or an external data repository.

The virtual concierge matching module 344 can scan the data exchange between the guest user 302 and the system operator 304 for keywords, for example, Italian food, golf, weather, luxury shopping, beaches, and so on, and use the selected keywords to tailor a respective 'Thank You For Staying" response to reflect the said guest's hotel stay and overall experience, for example, by reminding the guest of a dining experience or round of golf.

Figure 11:
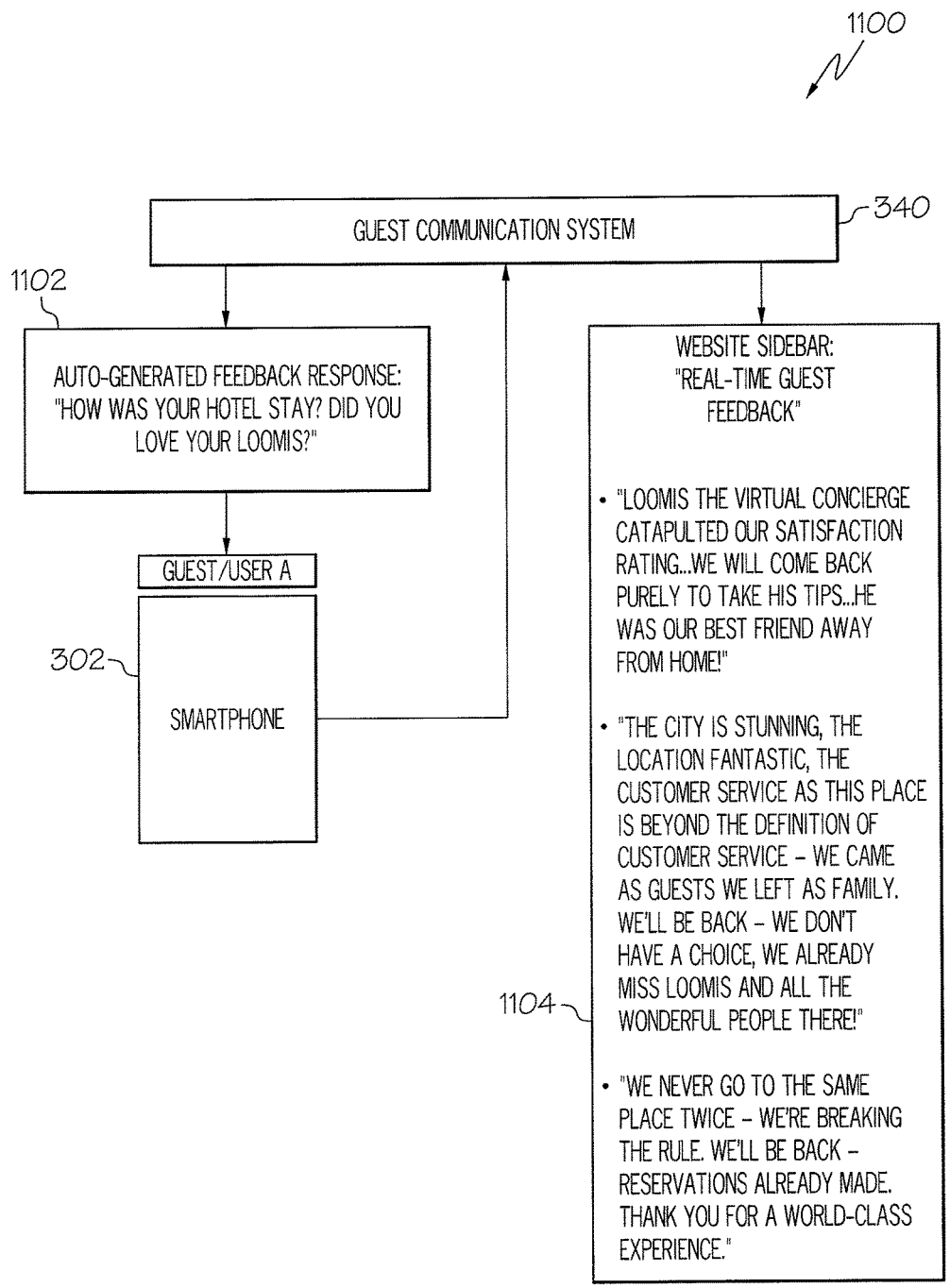
FIG. 11 is a flow diagram illustrating a feedback exchange with respect to a virtual concierge, in accordance with an embodiment.

FIG. 11 is a flow diagram illustrating a feedback exchange 1100 with respect to a virtual concierge, in accordance with an embodiment. In the feedback exchange 110, a guest user 302 can receive an automatic message from the guest communication system 340 asking for input regarding a hotel stay or other experience. The guest user 302 can provide a feedback response, which can be stored, and/or processed by the message processor 350. Excerpts from the feedback can be output, for example, as a website sidebar 1104 such as a homepage of the respective properties website.

The storage device 360 can also store guest preference information, text exchange contents between guest users and operators, keywords, frequency of used keywords or other text, and so forth, for future processing. For example, a guest user preference in Italian restaurants can be captured, and subsequently provided to a marketing firm collecting demographic data or the like.

FIG. 11 demonstrates the efficiency of the system to take an SMS text from a guest user detailing a hotel stay and overall experience and repurpose it to be a real time piece of feedback info on the website to be used as a customer testimonial and more importantly a marketing tool. When guest users opt-in to the guest communication system 340 for a virtual concierge, the user can be asked to agree to terms that state some of their messages can and will be used publically for marketing purposes over the duration of their hotel stay and at any time in the future.

Figure 12:
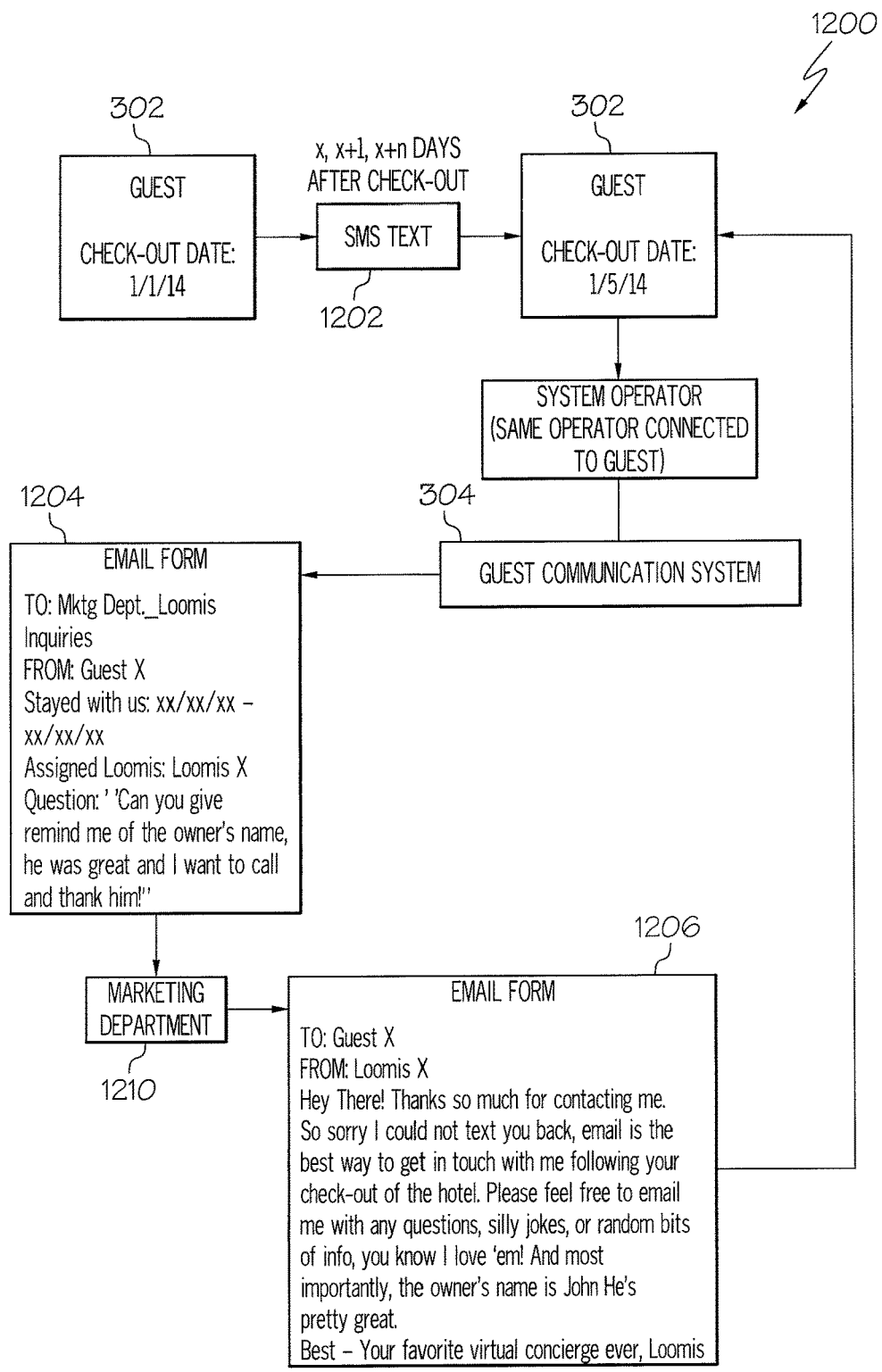
FIG. 12 is a diagram illustrating the flow of information and the management of texts to a guest communication system after a guest user has checked-out, in accordance with an embodiment.

FIG. 12 is the flow of information and the management of texts to a guest communication system after a guest user has checked-out, in accordance with an embodiment. A feature of the guest communication system 340 in accordance with an embodiment is the casual, human, and honest nature of system operator interactions with guest users 302. This feature may create a positive feeling for the guest user 302, who, even after check-out, is made aware that the virtual concierge of the system 340 is available to help in any way the guest 302 may need. The authentic element of a system operator's conversation with a guest user 302 allows the guest to experience confidence and comfort of receiving assistance after the stay. A guest user 302 is not discouraged from contacting a system operator 304 after their hotel stay.

Should a guest send a text message 1202 to a favorite system operator 304 after check-out, whether one day or several months later, the text is received and processed by the guest communication system 340, and can be redirected to a marketing department 1210 or the like in the form of an email 1204 with all relevant and essential information for an informed response. The email 1204 can include, but not be limited to, the following information: guest's name as it appears in the system, nickname or the like that guest used in communications via the system 340, dates the guests stayed and the exact time of check-out, name of system operator(s) matched with the guest user 302, and/or a question or body of inquiries made by the guest user 302.

The recipient 1210 of this data, for example, a marketing department system, can receive the email through a dedicated inbox specifically established for inquiries made by former users after a check-out." Keywords, phrases, or the like can be collected from the inquiries by the guest communication system 340 and used for data gathering, demographic reports, marketing information, and so on.

The Marketing Department responses can provide one or more semi-scripted responses, for example, an email 1206, for quality control but a designated representative can be responsible for tailoring each response to reflect the personality of Loomis/Guest's past conversation. Therefore, this feature can provide a strong ongoing marketing tool, driving the authenticity of the brand by encouraging communication with the concierge even past check-out which is not a benchmark currently in the hospitality industry.

Figure 13:
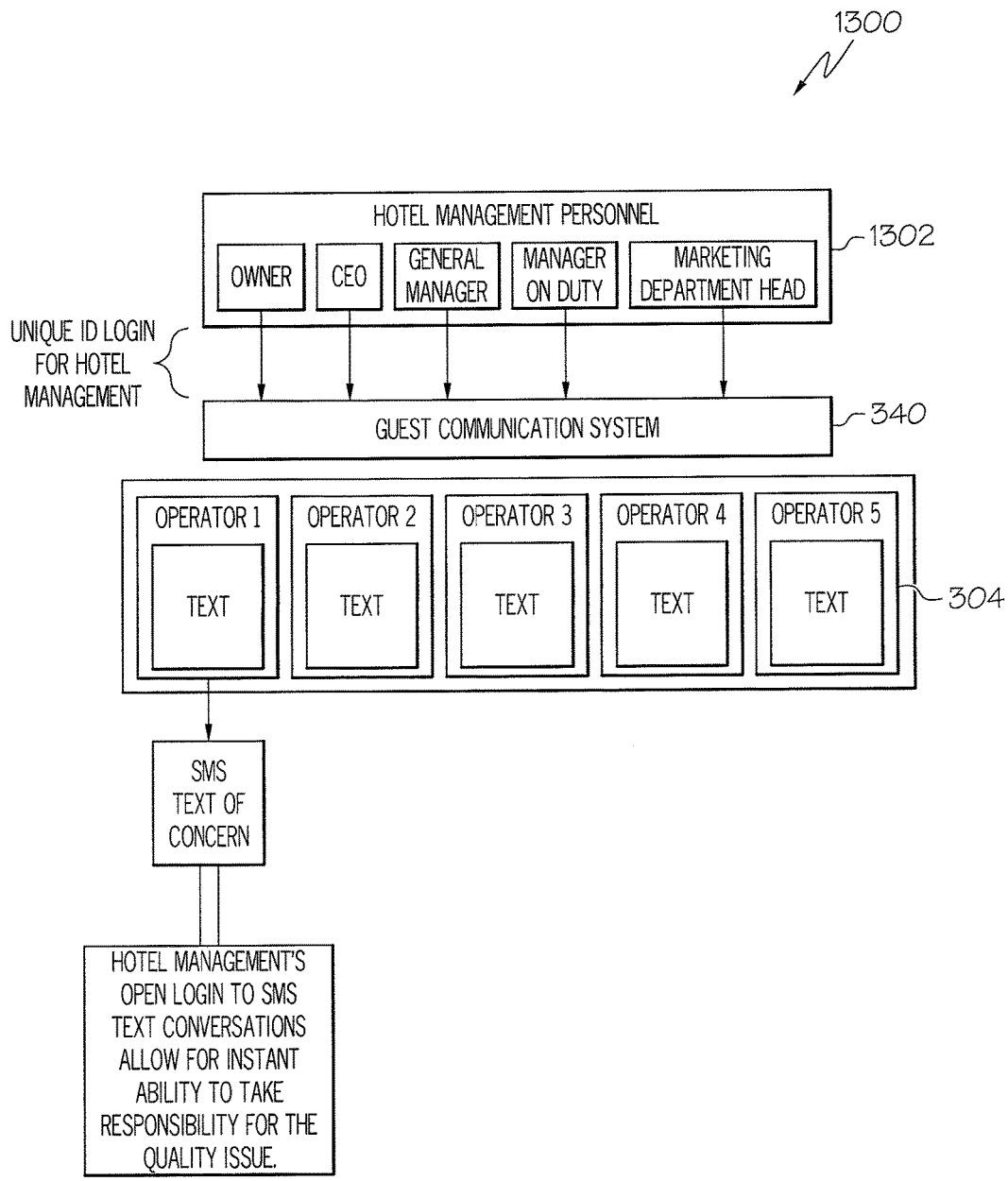
FIG. 13 is a diagram illustrating remote surveillance, management and quality control features of a guest communication system by organizational leaders such as top managers and directors.

FIG. 13 is a diagram illustrating remote surveillance, management and quality control features 1300 of a guest communication system by organizational leaders such as top managers and directors.

A feature of a guest communication system 340 in accordance with an embodiment lies in the open nature and setup as a transparent system, viewable by hotel management personnel 1302 as a way of laying the ground work for real checks and balances and quality control.

The role of visibility to upper management 1302 in the system 340 is not to interfere or govern tone, tips, or general knowledge of the operators 304 actively performing services, for example, assisting guest users 302, but rather to limit the liability of individual operators 304 and to lay the foundation for an accountable and professional network of communication between employees and guests.

Through unique logins hotel management (including but not limited to the owner/s, the general manager, the CEO, the Board of Directors, the Manager-On-Duty, and the respective department heads) is able to remotely login and track, follow, and read current and past Loomis/guest SMS text conversations.

For a seemingly informal and casual system for the guests, the remote login and access of hotel personnel strongly grounds the professionalism and limits any possible inappropriate situations or conversations, acting as a safety measure for both user and the virtual concierge service offered by the guest communication system 340.

Figure 14:
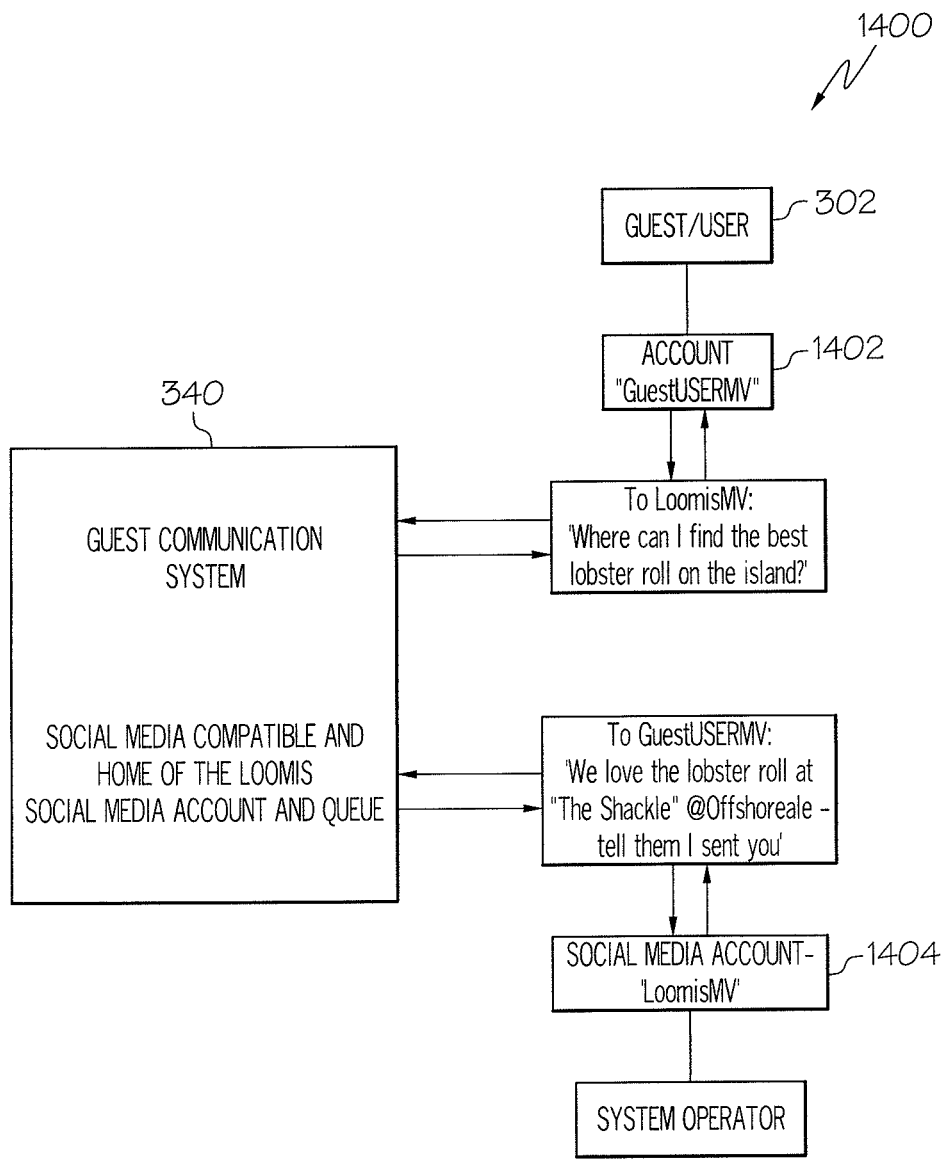
FIG. 14 is a diagram illustrating a guest communication system in communication with online services, in accordance with an embodiment.

FIG. 14 is a diagram 1400 illustrating a guest communication system 340 in communication with online services, in accordance with an embodiment.

An online service 1402 can be an online social networking service such as the Twitter™ service, or a service provided by a technology medium. The guest user 302 and the system operator 304 in communication with each other can each have an account 1402, 1404 with the service.

The guest communication system 340 can store user handles for each virtual concierge provided by the guest communication system 340. When a guest 302 sends a message, e.g., 'tweets', the virtual concierge at the guest communication system 340 using the given twitter handle, in this case as an example @LoomisMV. The virtual concierge matching module 344 can include a social media organizing tool to send a message to the respective operator phone 304 and that Loomis can tweet-back using the computer as the hub of information and tweet traffic. Messages are exchanged via the guest communication system 340 for tracking purposes, security, and/or accountability.

Figure 15:
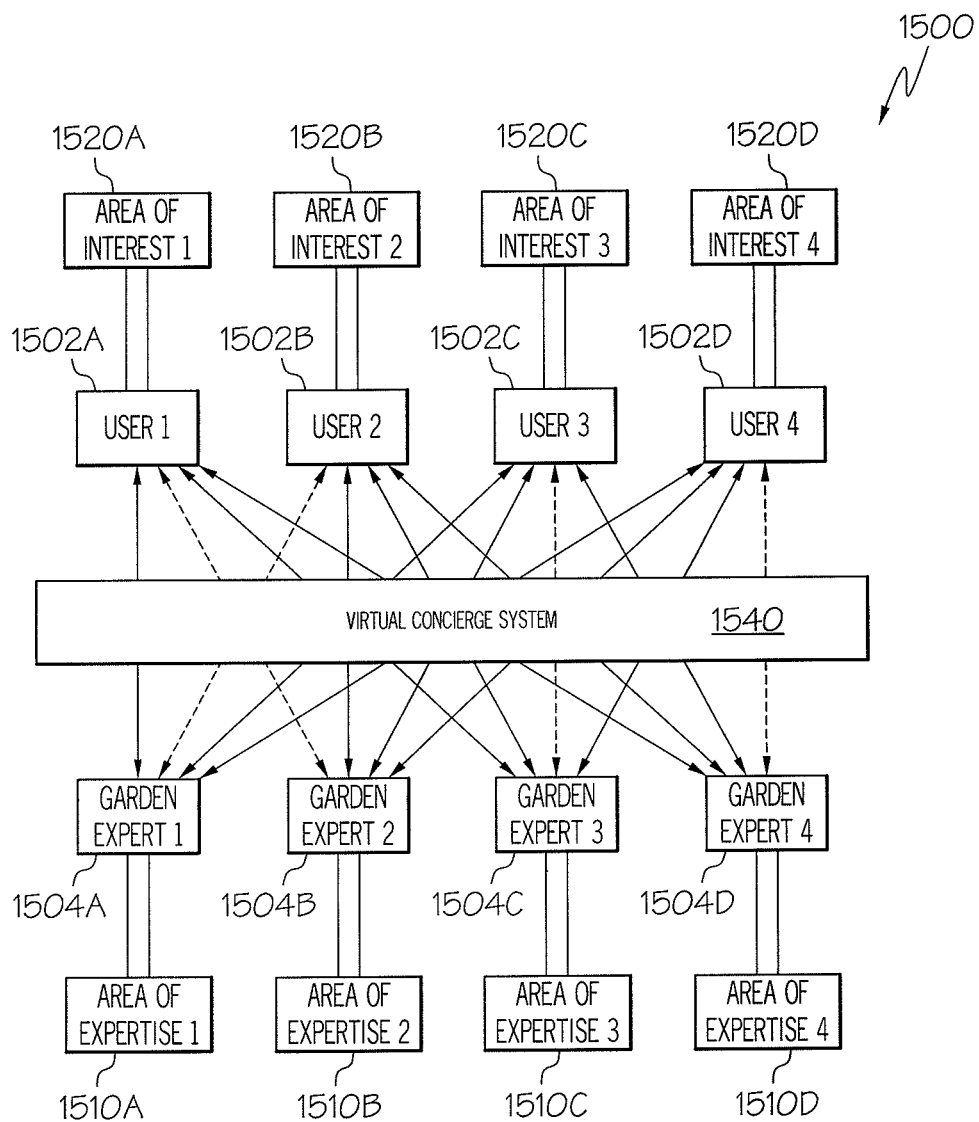
FIG. 15 is a diagram illustrating a virtual concierge system in communication between a plurality of users and a plurality of subject matter experts, in accordance with an embodiment.

FIG. 15 is a diagram illustrating a virtual concierge system 1540 in communication between a plurality of users 1502A-1504D (generally, 1502) and a plurality of subject matter experts 1504A-1504D (generally, 1504), for example, garden experts. The virtual concierge system 1540 can be similar to or the same as the guest communication system 340 described with respect to other embodiments, so elements thereof will not be repeated for brevity. The virtual concierge system 1540 can be tailored to uses outside of a hospitality industry function, for example, the virtual concierge system 1540 can be constructed and arranged for industries, businesses and organizations looking to enhance the communication between the potential users, guests, and interested parties and to drive revenue through low-cost sources that education current and potential customers/users. In FIG. 15, the virtual concierge system 1540 operators in a gardening environment.

The virtual concierge system 1540 includes an indexing engine that matches users with certain needs or features with experts with similar areas of expertise and knowledge that may address a user need identified in a text message inquiry. The indexing engine can generate a weight value pertaining to certain characteristics and preferences and generate a match in accordance with results according to the weighted characteristic or preferences. Each user 1504 has one or more areas of interest 1520A-1520D (generally, 1520). Each subject matter expert 1504 has one or more areas of expertise 1510A-1540D (generally, 1540). The virtual concierge system 1540 can establish a match between one or more user-expert pairs, and provides communication exchanges, i.e., SMS texts, between the paired participants (user & expert). An SMS text, for example, can be sent to and then redirected to the correct party in the form of another SMS message. A user 1502 and an expert 1504 do not interact directly with the centralized virtual concierge system 1540 because in terms of their physical connection to the system 1540 their only input and output is in the form of a simple SMS text. The primary use of the virtual concierge system 1540 then becomes a vehicle for matching like users and experts, a storage facility for past and present conversations and a regulator of SMS traffic and multiple conversations, similar to the guest communication system 340 described herein.

Accordingly, the base of functionality of the virtual concierge system 1540 includes built-in flexibility for a number of uses. As long as the given variables are present (user, computer system, and expert), the virtual concierge system 1540 can be framed for any organizations with marketable options to enhance user education and local, subject-specific knowledge.

Figure 16:
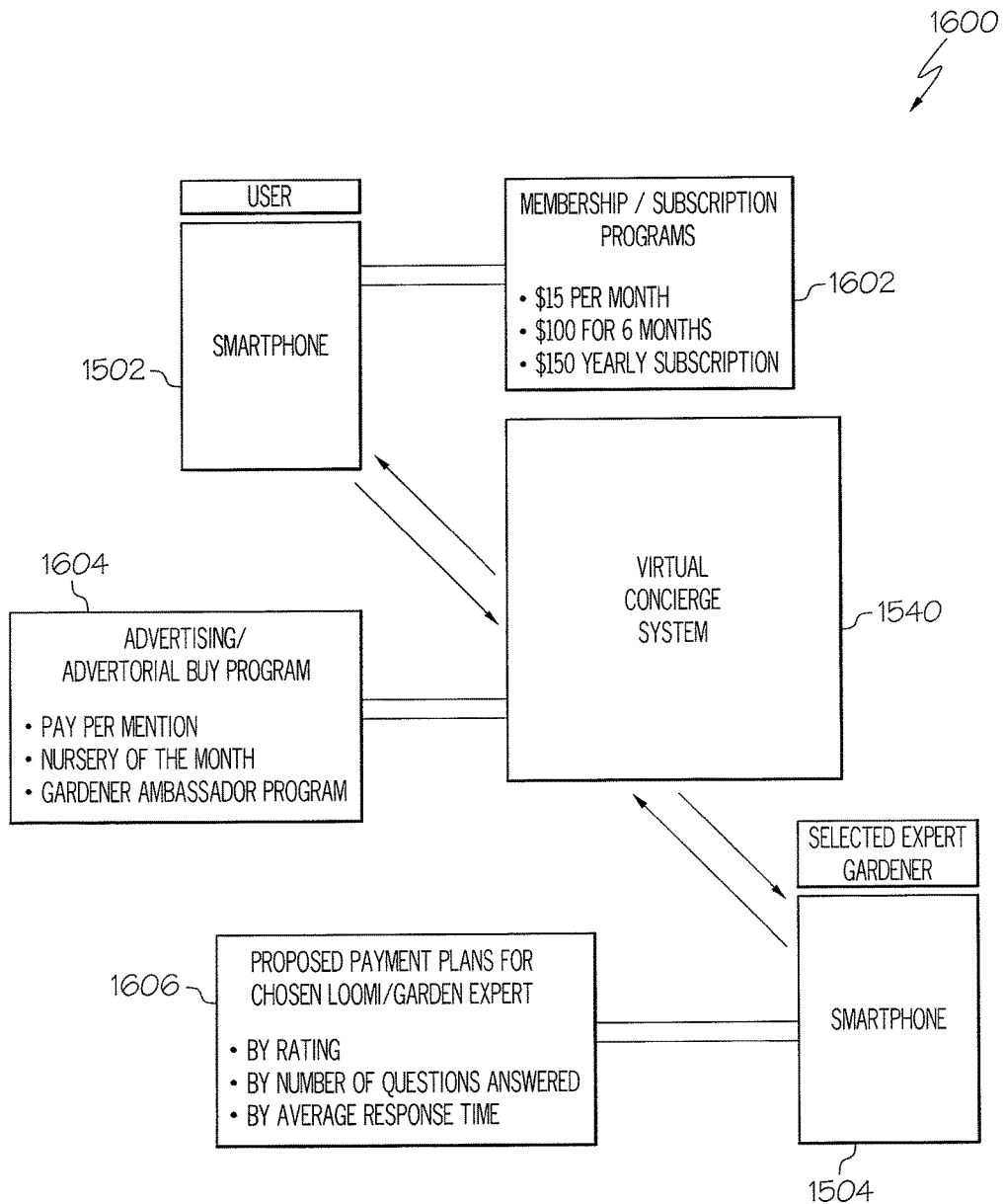
FIG. 16 is a diagram illustrating another application of a virtual concierge system, in accordance with an embodiment.

FIG. 16 is a diagram illustrating another application of a virtual concierge system 1540, in accordance with an embodiment. The virtual concierge system 1540 can be applied to applications that generate revenues, for example, for a non-hospitality enterprise, group, or organization.

A revenue stream can be generated by charging guest users 1502 for a paid-for membership or subscription 1602. As shown in Table 1, memberships and subscriptions can be planned out in predetermined increments, for example, monthly or annual payments.

|                     | Per Month ($15) | Per Year ($150) |
|---------------------|-----------------|-----------------|
| 0-15 Members/Users  | $0-$225         | $0-$2250        |
| 16-30 Members/Users | $240-$450       | $2400-$4500     |
| 31-45 Members/Users | $465-$675       | $4650-$6750     |

The revenue stream generated from potential advertising and advertorial buys in the program, shown at block 1604, can be a function of creative and subliminal brand placement and mentions. The cost of certain mentions, features, and ambassador programs is relative and can be offset by trade exchanges. The costs associated with payroll for experts 1504 providing services in concert with the virtual concierge system 1540 can be a function of three possible payment options 1606: by rating, by number of questions/inquiries answered, by average response time, and/or other statistical data. Below is a work-up of forecasted costs, by each payment plan.

TABLE 2

(By Rating—Forecasted costs by Number of Experts)

| Number of Experts | By rating (4 out of 10) $5.00 | By rating (6 out of 10) $10.00 | By rating (8 out of 10) $15.00 |
|---|---|---|---|
| 0-5   | $0-$25   | $0-$50     | $0-$50     |
| 6-10  | $30-$50  | $60-$100   | $90-$150   |
| 11-15 | $55-$75  | $110-$150  | $165-$225  |

TABLE 3

(By Number of Texts—Forecasted costs by Number of Experts)

| Number of Experts | By of Texts (50) $12.50 | By of Texts (75) $15.00 | By of Texts (90) $18.00 |
|---|---|---|---|
| 0-5   | $0-$62.50       | $0-$75      | $0-$90      |
| 6-10  | $75-$125        | $90-$150    | $108-$180   |
| 11-15 | $137.50-$187.50 | $165-$225   | $198-$270   |

TABLE 4

(By Average Response Time—Forecasted costs by Number of Experts)

| Number of Experts | By Ave. Resp. Time (30 sec) $12.50 | By Ave. Resp. Time (15 sec) $12.75 | By Ave. Resp. Time (5 sec) $17.00 |
| --- | --- | --- | --- |
| 0-5 | $0-$56.25 | $0-$63.75 | $0-$85 |
| 6-10 | $67.50-$112.50 | $76.50-$127.50 | $102-$170 |
| 11-15 | $123.75-$168.75 | $104.25-$191.25 | $187-$225 |

Figure 17:
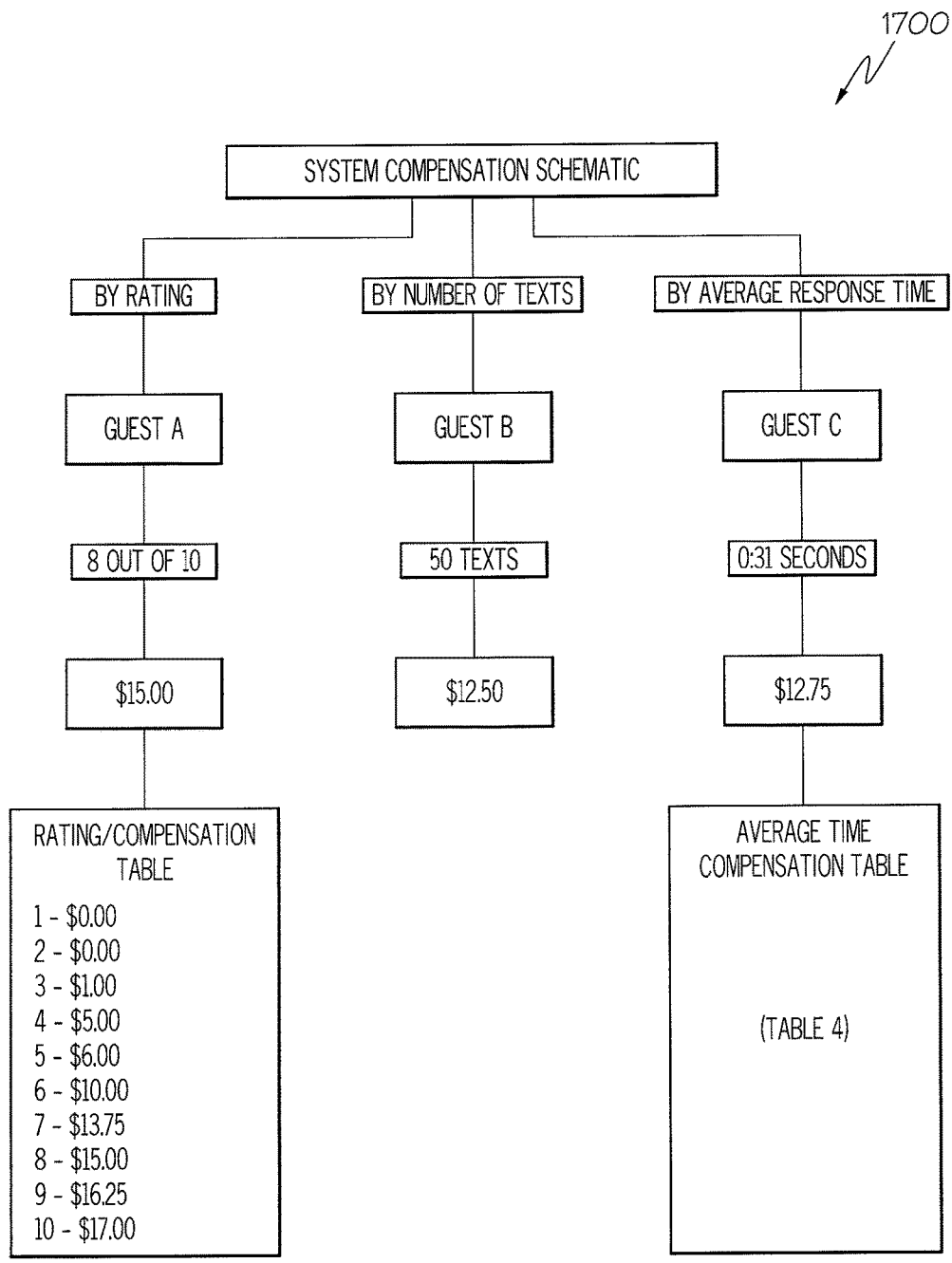
FIG. 17 is a diagram of proposed compensation structure options for hired virtual concierge system operators, in accordance with an embodiment.

FIG. 17 is a diagram of proposed compensation structure options 1700 for hired virtual concierge system operators.

FIG. 17 is a schematic showing the structure of the three compensation options for active system operators, i.e., system operators who are registered with the virtual concierge system and identified as receiving user inquiries or other communications. A system operator can select a compensation plan on a predetermined basis, for example, at the beginning of each day. A system operator can change a compensation plan on a predetermined basis, for example, at the beginning of every new day of work. Different compensation options are available, and can be modified, for example, each day, to compensate for changes payment based on performance. For example if a system operator is confident in his/her ability to surprise and delight a guest user, this system operator may select the ranking option. If a system operator is well-known for upholding long conversations, i.e., text exchanges, then a per text payment plan would be the most lucrative to this system operator, noting that a system operator can only send a text message to a guest in response to a guest inquiry or the like. The compensation plan for response time works well for those operators how are known for quick responses. However, this payment plan is based on a response time average.

Figure 18:
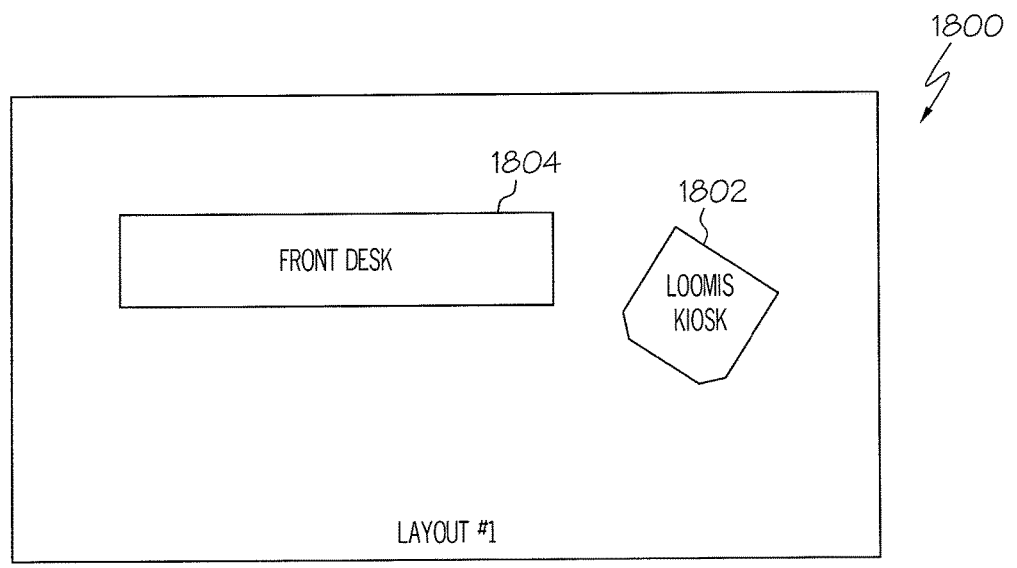
FIG. 18 is diagram of a layout illustrating a physical placement and location of a virtual concierge computer in a hotel, in accordance with an embodiment.
Figure 18:
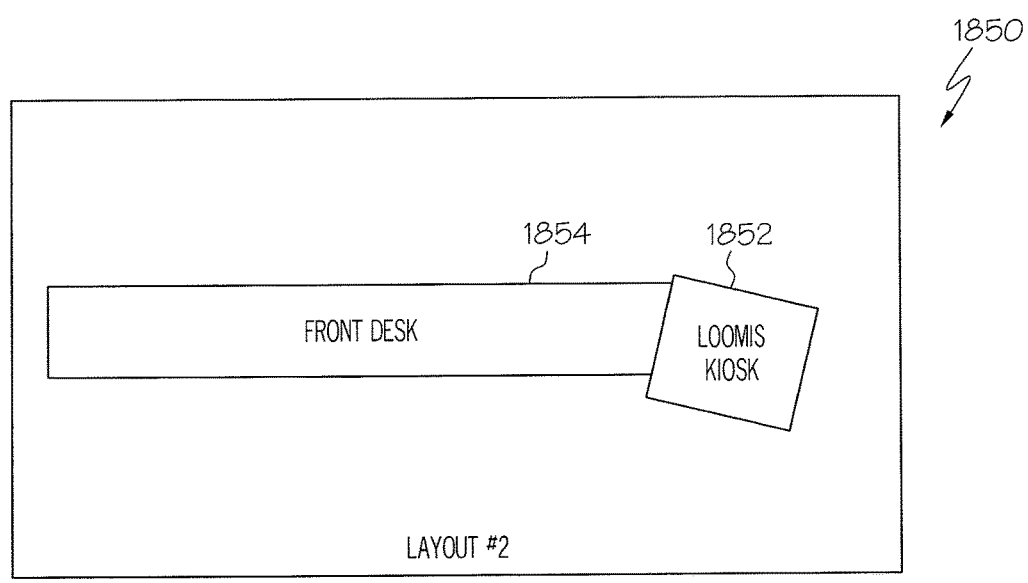

FIG. 18 illustrates a first layout 1800 of the physical placement and location of a virtual concierge kiosk 1802, referred to in FIG. 18 as a Loomis kiosk, in a hotel, for example, a lobby, relative to a front desk 1804, in accordance with an embodiment. FIG. 18 also illustrates a second layout 1850 of the physical placement and location of a virtual concierge kiosk 1852 in a hotel lobby relative to a front desk 1854. The kiosks 1802, 1852 can include at least one computer that permits a guest to communicate with one or more system operators via a guest communication system, for example, described in embodiments herein.

The physical first interaction and introduction a potential guest would have with their virtual concierge would happen almost concurrently with the guest check-in timing. A kiosk 1802, 1852 can be outfitted with 2-4 computers, depending on the size of the property. The computers can facing out, towards the lobby area, effectively inviting guests to 'shop' via the guest communication system 340 for their chosen system operator. Front desk personnel can direct guests toward the kiosk after check-in with a thorough introduction to the program as part of the check-in procedure. Other layouts can equally apply.

The kiosks 1802, 1852 can be self run and sustained by the computers in communication with the guest communication system, removing the need for a physical human to man the area. In the event that a guest at the kiosk my need assistance the kiosk 1802, 1852 is placed either separate but in close proximity of the front desk 1804, 1854, respectively, or physically attached to the kiosk 1802, 1852, respectively, at either end. In the event that a kiosk 1802, 1852 is physically attached at one end or the other of the front desk 1804, 1854, respectively, the kiosk 1802, 1852 can have design elements, material, or structural differences that may subconsciously call the kiosk 1802, 1852 out as being 'separate' from the main area of the front desk 1804, 1854, respectively.

In a related embodiment, a user can be provided with a tablet device or other display for selecting one or more virtual concierges, i.e., system operators accessible via the guest communication system. The user can perform this in a hotel lobby, a hotel room, a desk area, or other location. In an embodiment, a tablet device or other electronic device can be located at a lobby or a room such as a hotel room where a user can select a concierge via the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for establishing a communication between an electronic device of a hotel guest and an electronic device of an online assistant, comprising:

registering the electronic device of the hotel guest with a virtual concierge system for a hospitality institute;

registering the electronic device of the online assistants with the virtual concierge system;

recording profile data of the online assistant at a storage device in communication with the virtual concierge system;

receiving by a virtual concierge matching module stored in a computer memory and executed by a hardware processor of the virtual concierge system a text-based inquiry from the hotel guest having an interest;

storing by the virtual concierge matching module the inquiry in a queuing storage device of the virtual concierge system;

generating, by an indexing engine stored in a computer memory and executed by a hardware processor of the virtual concierge system an electronic match between the electronic device of the online assistant and the electronic device of the hotel guest by communicating with the queuing storage device to retrieve and compare content of the stored inquiry and the recorded profile data of the online assistant, the online assistant identified for addressing the hotel guest interest according to an understanding of subject matter of the content as compared by the virtual concierge system to the recorded profile data, the electronic match including the indexing engine generating a weight value according to predetermined characteristics preferences determined from the retrieved content of the stored inquiry and the profile data; and establishing by the virtual concierge system a text-based electronic communication between the electronic device of the hotel guest and the electronic device of the online assistant in response to generating the match, the text-based electronic communication including the content of the stored inquiry that is facilitated by the virtual concierge system between a display of the electronic device of the hotel guest and a display of the electronic device of the online assistant, wherein generating by the indexing engine the electronic match comprises:

assigning each of a plurality of online assistants' electronic devices registered with the virtual concierge system a value corresponding to personal information of a respective one of the online assistants;

displaying a menu at the display of the electronic device of the hotel guest that includes questions related to user preferences;

providing, to the display of the hotel guest electronic device, answers to the questions entered by the hotel quest;

assigning an indexed value to each answer; and comparing the indexed value to the value assigned to the each online assistant's electronic device registered with the virtual concierge system; and wherein the computer-implemented method for establishing a communication between an electronic device of a hotel guest and an electronic device of an online assistant further comprises:

displaying at a region of the display of the hotel guest electronic device a menu of possible matched online assistants from the indexed value comparison;

in response to a selection of a particular online assistant, automatically coupling the electronic device of the hotel guest to the electronic device of the selected online assistant for addressing the hotel guest interest according to an understanding by the online assistant of subject matter of the content of interest to the hotel guest as recorded by the profile data, the online assistant's electronic device identified and selected among the online assistants' electronic devices registered with the virtual concierge system and in the displayed menu according to a comparison result of the indexed value and the value assigned to the each online assistant's electronic device registered with the virtual concierge system;

displaying at a region of the display of the hotel guest electronic device a communication exchange that includes a set of questions or comments by the hotel guest and a set of operator replies from the display of the electronic device of the selected online assistant;

receiving by the hotel guest electronic device an automatic message from a guest communication system asking for input;

inputting from the hotel guest electronic device a feedback response; and repurposing the feedback response on a website for public display of the feedback response, wherein the virtual concierge system further comprises a social media organizing tool for forming a communication between the selected online assistant, the hotel guest, and an online service for tracking messages exchanged between the selected online assistant and the hotel guest, wherein the virtual concierge system further comprises a timer that monitors a response time to the text-based inquiry and automatically redirects the text-based inquiry to a manager's electronic device if the text-based inquiry a) remains unanswered for a predetermined amount of time questions or b) inappropriate keywords are detected, wherein the manager's electronic device is configured with a security permission feature to redirect the text-based inquiry from the manager's electronic device to at least one other online assistant.

2. The computer-implemented method of claim 1, wherein generating the match includes comparing the content of the stored inquiry and the profile data of the online assistant.

3. The computer-implemented method of claim 2, wherein the user or a third party user reviews the profile data and generates the match by selecting the online assistant from a plurality of online assistants.

4. The computer-implemented method of claim 1, wherein the subject matter of the content includes at least one of local knowledge and tips, restaurants, activities, emergency information, maps, directions, or financial information.

5. The computer-implemented method of claim 1, further comprising:
monitoring the text-based communication;
identifying, by the virtual concierge system, at least one keyword in the content; and
performing an action corresponding to the identified at least one keyword.

6. The computer-implemented method of claim 5, wherein the action includes generating a message that includes content related to the at least one keyword.

7. The computer-implemented method of claim 5, wherein the action includes outputting the at least one keyword to a marketing tool.

8. The computer-implemented method of claim 1, further comprising:
forwarding, by the virtual concierge system, the inquiry to an electronic device of a manager in response to a failure by the online assistant to participate in the text-based communication with the user in a predetermined period of time; and
generating, by the manager, a match that includes another online assistant.

9. The computer-implemented method of claim 1, further comprising:
sending, by the user, a voice communication to the virtual concierge system; and
generating, by the virtual concierge system, a text message informing the user that text communications are proper communications.

10. The computer-implemented method of claim 1, wherein the text-based communication is performed over a social networking service.

11. The computer-implemented method of claim 1, wherein generating the match includes determining a weight score of the weight value from characteristics and preferences determined from the content of the stored inquiry and the profile data.

12. The computer-implemented method of claim 1, further comprising determining statistics of a plurality of online assistants in communication with the virtual concierge system to at least one of determine which online assistant receives the most accepted responses, which online assistant posts the fastest response times, which online assistant receives the highest feedback rating, or which online assistant answers the most text inquiries from guest users.

13. The computer-implemented method of claim 12, further comprising generating a revenue stream according to at least one of operator rating statistics, inquiry statistics, or response time statistics.

14. The computer-implemented method of claim 1, further comprising:
displaying at a display of an electronic device of an agent a listing of the online assistants and changing at the display the online assistants to different online assistants.

15. A computer-implemented method for establishing a communication between an electronic device of a hotel guest and an electronic device of an online assistant, comprising:
introducing a hotel guest to a virtual concierge system;
registering an electronic device of the hotel guest with the virtual concierge system;
registering an electronic device of an online assistant with the virtual concierge system;
recording profile data of the online assistant at a storage device in communication with the virtual concierge system; and
directing via the virtual concierge system an interest-related inquiry sent electronically from the electronic device of the hotel guest to the electronic device of the online assistant according to the profile data of the assistant, the profile data including data identifying knowledge of the interest;

generating by an indexing engine of the virtual concierge system an electronic match including generating a weight value according to predetermined characteristics and preferences determined from the retrieved content of the interest-related inquiry and the profile data, wherein generating by the indexing engine the electronic match further comprises:

assigning each of a plurality of online assistants' electronic devices registered with the virtual concierge system a value corresponding to personal information of a respective one of the online assistants;

displaying a menu at a region of the display of the electronic device of the hotel guest that includes questions related to user preferences;

providing, by the display of the electronic device of the hotel guest, answers to the questions entered by the hotel quest;

assigning an indexed value to each answer;

comparing the indexed value to the value assigned to the each online assistant's electronic device registered with the virtual concierge system; and wherein the computer-implemented method for establishing a communication between an electronic device of a hotel guest and an electronic device of an online assistant further comprises:

displaying at a region of the display of the hotel guest electronic device a menu of possible matched online assistants from the indexed value comparison;

in response to a selection of a particular online assistant, automatically coupling the electronic device of the hotel guest to the electronic device of the selected online assistant for addressing the hotel guest interest according to an understanding by the selected online assistant of subject matter of the content of interest to the hotel guest as recorded by the profile data, the online assistant's electronic device identified and selected among online assistants' electronic devices registered with the virtual concierge system and in the displayed menu according to a comparison result of the indexed value and the value assigned to the each online assistant's electronic device registered with the virtual concierge system; and displaying at a region of the display of the hotel guest electronic device a communication exchange that includes a set of questions or comments by the hotel guest and a set of operator replies from the display of the selected electronic device of the online assistant;

receiving by the hotel guest electronic device an automatic message from a virtual concierge system asking for input;

inputting from the hotel guest electronic device a feedback response; and repurposing the feedback response on a website for public display of the feedback response, wherein the virtual concierge system further comprises a social media organizing tool for forming a communication between the selected online assistant, the hotel guest, and an online service for tracking messages exchanged between the online assistant and the hotel guest, wherein the virtual concierge system further comprises a timer that monitors a response time to the text-based inquiry and automatically redirects the text-based inquiry to a manager's electronic device if the text-based inquiry a) remains unanswered for a predetermined amount of time questions or b) inappropriate keywords are detected, wherein the manager's electronic device is configured with a security permission feature to redirect the text-based inquiry from the manager's electronic device to at least one other online assistant.

16. The method of claim 15, further comprising:

monitoring a text-based communication between the hotel guest and the agent established in response to detecting the interest-related inquiry; and performing an action corresponding to content in the interest-related inquiry.

17. A guest communication system, comprising:

a processor;

a text-messaging interface that establishes an electronic communication with at least one of an electronic device of a guest user and an electronic device of an online assistant, the electronic device of the guest user and the electronic device of the online assistant each registered with the guest communication system;

a profile module that includes data corresponding to subject matter knowledge of the online assistant, the profile data stored electronically at a storage device; and an indexing engine that generates an electronic match between the online assistant and the user by comparing content of a text-based inquiry sent from the electronic device of the user and the stored profile data of the online assistant, and that permits the user to select the online assistant, the indexing engine generating a weight value according to predetermined characteristics and preferences determined from the retrieved content of the stored inquiry and the profile data, comprising:

assigning each of a plurality of online assistants' electronic devices registered with the virtual concierge system a value corresponding to personal information of a respective one of the online assistants;

displaying a menu at a display of the electronic device of the user that includes questions related to user preferences;

providing, by the user, answers to the questions; assigning an indexed value to each answer; and comparing the indexed value to the value assigned to the each online assistants electronic device registered with the virtual concierge system; wherein the display of the electronic device of the user is constructed and arranged to:

display at a region of the display of the hotel guest electronic device a menu of possible matched online assistants from the indexed value comparison;

in response to a selection of a particular online assistant, automatically couple the electronic device of the user to the electronic device of the selected online assistant for addressing the user interest according to an understanding by the selected online assistant of subject matter of the content of interest to the user as recorded by the profile data, the online assistant's electronic device identified and selected among online assistants' electronic devices registered with the virtual concierge system and in the displayed menu according to a comparison result of the indexed value and the value assigned to the each online assistant's electronic device registered with the virtual concierge system;

display at a region of the display of the user electronic device a communication exchange that includes a set of questions or comments by the hotel guest and a set of operator replies from the display of the selected electronic device of the online assistant;

receive by a hotel guest electronic device an automatic message from the guest communication system asking for input;
inputting from the hotel guest electronic device a feedback response; and
repurposing the feedback response on a website for public display of the feedback response,
wherein the virtual concierge system further comprises a social media organizing tool for forming a communication between the selected online assistant, the hotel guest, and an online service for tracking messages exchanged between the selected online assistant and the hotel guest,
wherein the virtual concierge system further comprises a timer that monitors a response time to the text-based inquiry and automatically redirects the text-based inquiry to a manager's electronic device if a) the text-based inquiry remains unanswered for a predetermined amount of time questions or b) inappropriate keywords are detected, wherein the manager's electronic device is configured with a security permission feature to redirect the text-based inquiry from the manager's electronic device to at least one other online assistant,
wherein the profile module, indexing engine and virtual concierge system are executed by the processor.

18. The guest communication system of claim 17, further comprising a storage device for storing the profile data, the content of the text-based inquiry, and a text-based communication between the guest user and the online assistant.

19. The guest communication system of claim 18, further comprising an interface for providing the text-based communication over a social networking service.

20. The guest communication system of claim 17, further comprising an interface for outputting elements of the content to a marketing tool.

* * * * *

UNITED STATES PATENT AND TRADEMARK OFFICE
CERTIFICATE OF CORRECTION

PATENT NO. : 10,200,315 B2
APPLICATION NO. : 13/833845
DATED : February 5, 2019
INVENTOR(S) : John V. Tiernan Page 1 of 1

It is certified that error appears in the above-identified patent and that said Letters Patent is hereby corrected as shown below:

In the Claims

Claim 1, Column 20, Line 11, please remove "s" from the end of the word "assistants".

Claim 1, Column 20, Line 36, please insert --and-- after "characteristics" and before "preferences".

Claim 1, Column 20, Line 59, please remove "quest" after "hotel" and before ";" and replace it with "guest".

Claim 1, Column 21, Line 42, please remove "questions" after "time" and before "or".

Claim 15, Column 23, Line 17, please remove "quest" after "hotel" and before ";" and replace it with "guest".

Claim 15, Column 23, Line 66, please remove "questions" after "time" and before "or".

Claim 17, Column 25, Line 19, please remove "questions" after "time" and before "or".

Signed and Sealed this
Twenty-eighth Day of January, 2020

Andrei Iancu
*Director of the United States Patent and Trademark Office*